United States Patent
Mihara et al.

[11] Patent Number: 6,122,032
[45] Date of Patent: Sep. 19, 2000

[54] WEDGE SHAPED LCD WITH CHANGE IN DISPERSION DENSITY OF SPACERS

[75] Inventors: Tadashi Mihara; Tetsuro Saito; Akihiko Komura, all of Isehara; Sunao Mori, Utsunomiya; Chikako Tsujita, Chiba, all of Japan

[73] Assignee: Canon Kabushiki Kaisha, Tokyo, Japan

[21] Appl. No.: 08/902,911

[22] Filed: Jul. 30, 1997

[30] Foreign Application Priority Data

Jul. 31, 1996 [JP] Japan .................................. 8-202054

[51] Int. Cl.[7] .................................................. G02F 1/1339
[52] U.S. Cl. .......................................... 349/155; 349/157
[58] Field of Search .................................. 349/155, 157, 349/85

[56] References Cited

U.S. PATENT DOCUMENTS

| | | | |
|---|---|---|---|
| 4,712,877 | 12/1987 | Okada et al. | 350/350 |
| 4,740,060 | 4/1988 | Komura et al. | 350/344 |
| 4,971,829 | 11/1990 | Komura et al. | 427/27 |
| 5,124,825 | 6/1992 | Asano et al. | 350/337 |
| 5,276,542 | 1/1994 | Iwayama et al. | 359/86 |
| 5,285,304 | 2/1994 | Hotta et al. | 359/81 |
| 5,381,256 | 1/1995 | Hanyu et al. | 359/75 |
| 5,497,257 | 3/1996 | Hotta et al. | 359/81 |
| 5,548,429 | 8/1996 | Tsujita | 359/80 |
| 5,589,964 | 12/1996 | Hotta et al. | 349/160 |
| 5,638,195 | 6/1997 | Katakura et al. | 349/143 |
| 5,644,372 | 7/1997 | Shinjo et al. | 349/319 |
| 5,668,615 | 9/1997 | Miyata | 349/126 |

FOREIGN PATENT DOCUMENTS

| | | |
|---|---|---|
| 56-107216 | 8/1981 | Japan . |
| 03252624 | 11/1991 | Japan . |

*Primary Examiner*—William L. Sikes
*Assistant Examiner*—Heidi L. Eisenhut
*Attorney, Agent, or Firm*—Fitzpatrick, Cella, Harper & Scinto

[57] ABSTRACT

A liquid crystal device is constituted by a pair of oppositely disposed substrates each provided with a plurality of electrodes and a chiral smectic liquid crystal disposed so as to fill a prescribed gap between the substrates together with a plurality of spacers dispersed therein. The substrates includes a substrate having four sides at least one of which has a connecting portion to be connected with a drive circuit supplying a voltage to associated electrodes. The prescribed gap is decreased with an increasing distance from the connecting portion, whereby an uneven temperature distribution within the device resulting from heat generation in the vicinity of the connecting portion for the drive circuit can be alleviated or minimized to improve a display irregularity.

17 Claims, 21 Drawing Sheets

DEVICE 1

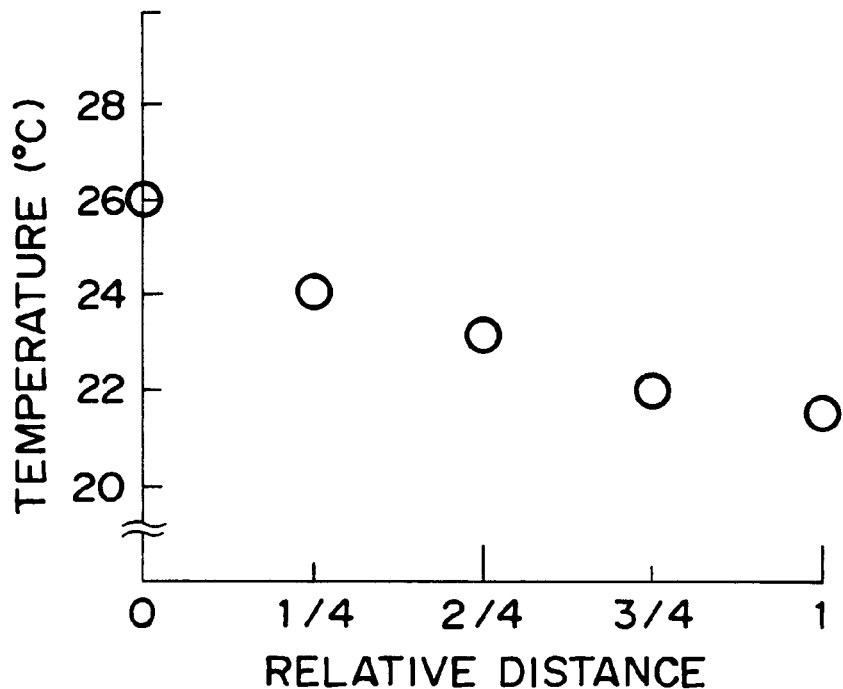
F I G. 7A
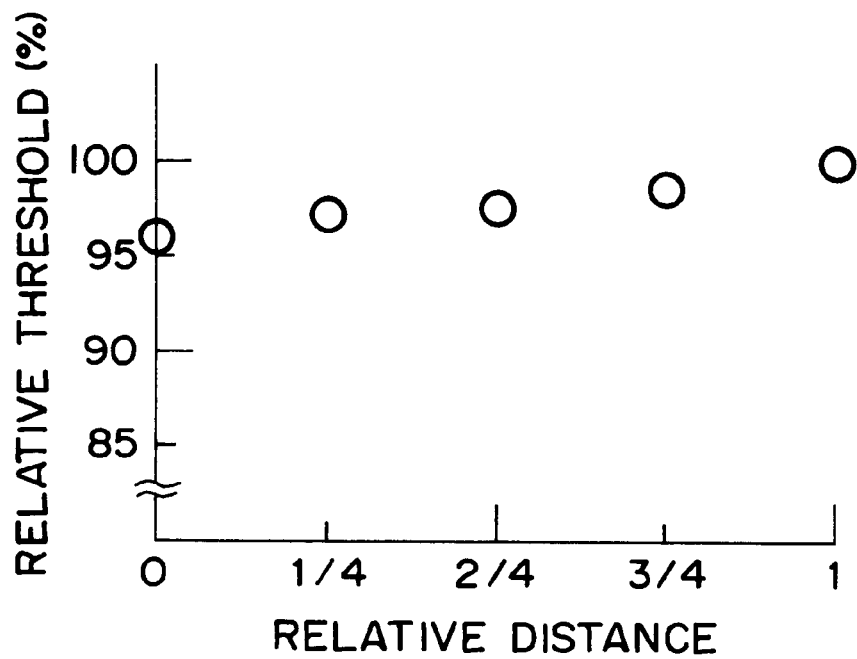
F I G. 7B

WEDGE SHAPED LCD WITH CHANGE IN DISPERSION DENSITY OF SPACERS

FIELD OF THE INVENTION AND RELATED ART

The present invention relates to a liquid crystal device including a pair of substrates each provided with electrodes and a liquid crystal disposed between the substrates, particularly a liquid crystal device having a specific cell structure effective in suppressing a display unevenness due to heat generation during the drive of the device.

A liquid crystal device of the type which controls transmission of light in combination with a polarizing device by utilizing a refractive index anisotropy of chiral smectic liquid crystal molecule has been proposed by Clark and Lagerwall (Japanese Laid-Open Patent Application (JP-A) 56-107216 corr. to U.S. Pat. No. 4,367,924). The chiral smectic liquid crystal generally has chiral smectic phase in a specific temperature range and, in the phase, shows a property of assuming either one of a first optically stable state and a second optically stable state in response to an electric field applied thereto and maintaining such a state in the absence of an electric field, namely bistability, and also have a very quick response characteristic in response to a charge in applied electric field. Accordingly, the liquid crystal device using the chiral smectic liquid crystal is expected to be widely used as a display device of a high speed and a memory-type.

In order to realize the bistability described above, however, it is necessary to make a gap (or effective distance) between a pair of substrates (corr. to a thickness of a liquid crystal layer; hereinafter referred to as "cell gap") small to suppress the formation of a helical structure intrinsic to the above-mentioned chiral smectic liquid crystal. Further, the cell gap is required to be made small uniformly in order to prevent a color-changing phenomenon such that a part of a display area is changed in its color towards a prescribed color (e.g.,yellow) caused depending on a relationship between a birefringence of the liquid crystal used and the cell gap.

In the case of adopting a small cell gap, a distance between transparent electrodes provided to a pair of substrates is correspondingly decreased. As a result, a capacitance of a resultant liquid crystal device becomes large. Accordingly when such a liquid crystal device (chiral smectic liquid crystal device) is driven by using a driver IC (integrated circuit) as a drive circuit formed at a side of the substrates, a degree of heat generation at the side becomes large, thus leading to a temperature distribution within a panel area of the liquid crystal device . As a result, drive characteristics (e.g., a threshold characteristic ) of liquid crystal molecules are correspondingly liable to become uniform, thus resulting in a display irregularity and a deterioration in display quality.

SUMMARY OF THE INVENTION

In view of the above-described problems, a principal object of the present invention is to provide a liquid crystal device, particularly a chiral smectic liquid crystal device having a small cell gap, capable of obviating or suppressing an excessively uniform temperature distribution and display irregularity within a liquid crystal panel area caused due to heat generation in the vicinity of a connecting portion where a drive circuit (e.g., a driver IC) is electrically connected with associated transparent electrodes.

Another object of the present invention is to provide a process for producing the liquid crystal device and a liquid crystal display apparatus including the liquid crystal device and illumination means.

According to the present invention, there is provided a liquid crystal device, comprising: a pair of oppositely disposed substrates each provided with a plurality of electrodes and a chiral smectic liquid crystal disposed so as to fill a prescribed gap between the substrates together with a plurality of spacers dispersed therein, the substrates including a substrate having four sides at least one of which has a connecting portion to be connected with a drive circuit supplying a voltage to associated electrodes; wherein the prescribed gap is decreased with an increasing distance from the connecting portion.

According to the present invention, there is also provided a liquid crystal device, comprising: a pair of oppositely disposed substrates each provided with a plurality of electrodes and a liquid crystal disposed so as to fill a prescribed gap between the substrates together with a plurality of spacers dispersed therein, the substrates including a substrate having four sides at least one of which has a connecting portion to be connected with a drive circuit supplying a voltage to associated electrodes; wherein the spacers show a dispersion density change depending on a distance from the connecting portion.

According to the present invention, there is further provides a process for producing a liquid crystal device comprising a pair of oppositely disposed substrates each provided with a plurality of electrodes and a liquid crystal disposed so as to fill a prescribed gap between the substrates together with a plurality of spacers dispersed therein, the process comprising the steps of:

disposing a sealing agent at a periphery of one of the substrate so as to provide a first sealing portion disposed along the periphery without an injection port for filling the liquid crystal in the prescribed gap and a second sealing portion disposed at least partially parallel with the first sealing portion, dispersing a plurality of spacers on either one of the substrates at a dispersion density varying depending on a distance from at least one side, of the substrates, having a connecting portion to be connected with a drive circuit supplying a voltage to associated electrodes, and adhesively bonding the pair of substrates to each other with the sealing agent cured under heating and pressure.

The present invention also provides a liquid crystal display apparatus, comprising:

a liquid crystal device comprising a pair of oppositely disposed substrates each provided with a plurality of electrodes and a liquid crystal disposed so as to fill a prescribed gap between the substrates together with a plurality of spacers dispersed therein, the substrates including a substrate having four sides at least one of which has a connecting portion to be connected with a drive circuit supplying a voltage to associated electrodes; wherein the prescribed gap is changed depending on a distance from the connecting portion; and illumination means for illuminating the liquid crystal device with a planar light providing a chromaticity distribution depending on the change in the prescribed gap.

The present invention further provides a liquid crystal display apparatus, comprising:

a liquid crystal device comprising a pair of oppositely disposed substrates each provided with a plurality of electrodes and a liquid crystal disposed so as to fill a prescribed gap between the substrates together with a plurality of spacers dispersed therein, the substrates including a substrate having four sides at least one of which has a connecting portion to be connected with a drive circuit supplying a voltage to associated electrodes; wherein the spacers show a dispersion density changed depending on a distance from the connecting portion; and illumination means for illuminating the liquid crystal device with a planar light providing a chromaticity distribution depending on the change in the dispersion density.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A, 9A, 11A and 12A are graphs showing temperature distributions for Devices 1, 2, 3 and 4, respectively; and FIGS. 7B, 9B, 11B and 12B are graphs showing threshold value distributions for Devices 1, 2, 3 and 4, respectively.

DESCRIPTION OF THE PREFERRED EMBODIMENTS

As described hereinabove, in a liquid crystal device (particularly a chiral smectic liquid crystal device) wherein a (chiral smectic) liquid crystal is disposed with a small cell gap between a pair of substrates each having thereon electrodes, a capacitance of the resultant liquid crystal device becomes large to cause heat generation of a drive circuit (e.g., a driver IC), thus heating the liquid crystal in the vicinity of a portion at a side (edge) of the associated substrate where the drive circuit is electrically connected with the associated electrodes (herein, such a portion is referred to as "connecting portion"). The degree of heating generally varies depending on a distance from the connecting portion, thus leading to a temperature distribution within a panel area when the liquid crystal device is driven by actuating the drive circuit. As a result, the resultant drive characteristic (e.g., a threshold pulse width or a threshold voltage) is liable to have an excessively uniform distribution.

In the present invention, the cell gap (the liquid crystal layer thickness) of the liquid crystal device used is controlled to have a decreased value with an increase in distance from the drive circuit connecting portion, whereby an electric field strength (intensity) applied to the liquid crystal at the time of the drive of the liquid crystal device is caused to have an optimum distribution, thus compensating or counterbalancing the above-mentioned drive characteristic distribution to provide a uniform display characteristic.

Hereinbelow, preferred embodiment of the liquid crystal device according to the present invention will be specifically described with reference to FIGS. 1–4, 21 and 22.

Figure 1A:
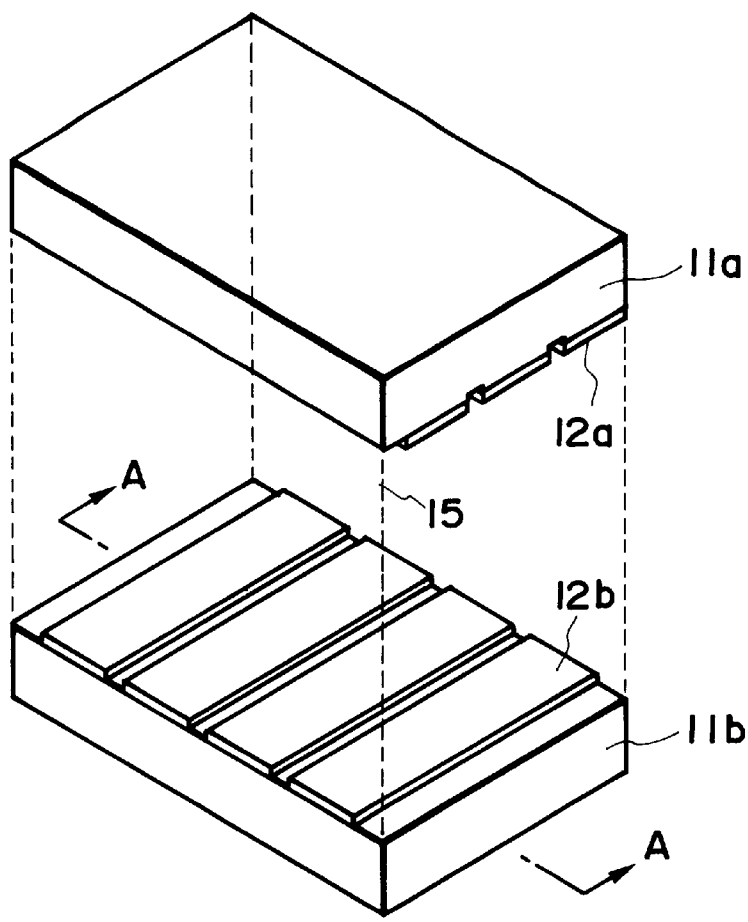
FIG. 1A is a schematic perspective view of an embodiment of the liquid crystal device according to the present invention.
Figure 1B:
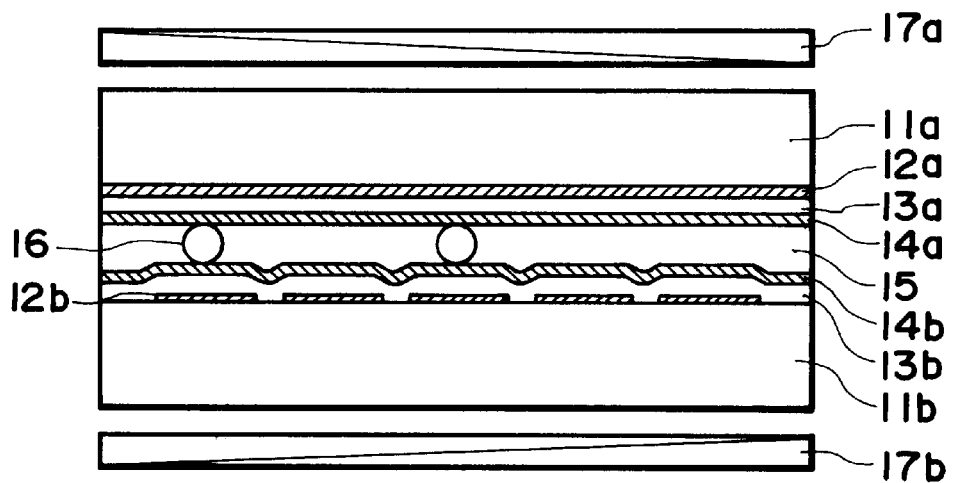
FIG. 1B is a schematic sectional view taken along A—A line in FIG. 1A.

FIG. 1A shows a perspective cell structure of the liquid crystal device of the present invention and FIG. 1B shows a sectional cell structure of the liquid crystal device taken along A—A line in FIG. 1A.

Referring to these figures, the liquid crystal device (liquid crystal panel) includes a pair of substrates 11a and 12b of, e.g., glass each provided with a plurality of transparent electrodes of one substrates intersect with those of the other substrate at right angles). The transparent electrodes 12a and 12b comprise a ca. 400–3000 Å thick film of, e.g., $In_2O_3$, $SnO_2$ or ITO (indium tin oxide).

In the case where the liquid crystal device having such a matrix electrode structure is driven according to a multiplexing driving scheme, e.g., the transparent electrodes 12a corresponding to scanning electrodes and the transparent electrodes 12b correspond to data electrodes. Further, with respect to each substrate 11a (11b), at least one side of the substrate 11a (11b) has a connecting portion electrically connected with a drive circuit (driver IC) (not shown) supplying a scanning signal (voltage) to the scanning electrodes or a data signal (voltage) to the data electrodes. The drive circuit may be electrically connected with one connecting portion of the substrate 11a (11b) or two opposite connecting portions of the substrate 11a (11b) determined depending on, e.g., the number of the scanning (or data) electrodes. In this instance, each connecting portion may generally be provided to the substrate 11a (11b) at its side (edge) perpendicular to the associated electrodes but may be provided to the substrate 11a (11b) at its side parallel to the associated electrodes, as desired.

The transparent electrodes 12a (12b) are covered with an alignment control film 14a (14b) via an insulating film 13a (13b) optionally formed on the transparent electrodes 12a (12b) as shown in FIG. 1B.

The insulating film 13a (13b) may comprise an inorganic insulating material or an organic insulating material. Examples of the inorganic insulating material may include: silicon nitride, silicon carbide containing hydrogen, silicon oxide, boron nitride, boron nitride containing hydrogen, cerium oxide, aluminum oxide, zirconium oxide, titanium oxide, tantalum oxide, and magnesium fluoride.

The insulating film 13a (13b) may have a single layer structure or a lamination structure of two or more layers, thus having a function of preventing a short circuit between the oppositely substrates (electrodes). the insulating film 13a (13b) may include a wet coating-type insulating layer of, e.g., Ti—Si formed on the layer of an inorganic (or organic) insulating material.

The alignment control film 14a (14b) may comprise an organic (or inorganic) insulating material. Examples of the organic insulating material may include: polyvinyl alcohol, polyimide, polyamideimide, polyester-imide, polyparaxylylene, polyester, polycarbonate, polyvinyl acetal, polyvinyl chloride, polyvinyl acetate, polyamide, polystyrene, cellulosic resin, melamine resin, urea resin, acrylic resin, and photoresist resin.

Alternatively, it is also possible to form a single layer of inorganic insulating alignment control layer or organic insulating alignment control layer instead of the insulating film 13a (13b) and the alignment control film 14a (14b).

The insulating film 13a (13b) and alignment control film 14a (14b) comprising an inorganic insulating material may be formed by vapor deposition, while those comprising an organic insulating material may be formed by applying a solution of an organic insulating material or a precursor thereof in a concentration of 0.1 to 20 wt. %, preferably 0.2–10 wt. %, by spinner coating, dip coating, screen printing, spray coating or roller coating followed by curing or hardening under prescribed hardening condition (e.g., under heating).

Each of the insulating layer 13a (13b) and the alignment control layer 14a (14b) may generally have a thickness of 3–1000 nm, preferably 4–300 nm, further preferably 4–100 nm.

In the present invention, at least one of the alignment control films 14a and 14b has been subjected to a uniaxial aligning treatment such as a rubbing treatment with gauze or acetate fiber-planted cloth, irrespective of its layer structure.

Figure 2A:
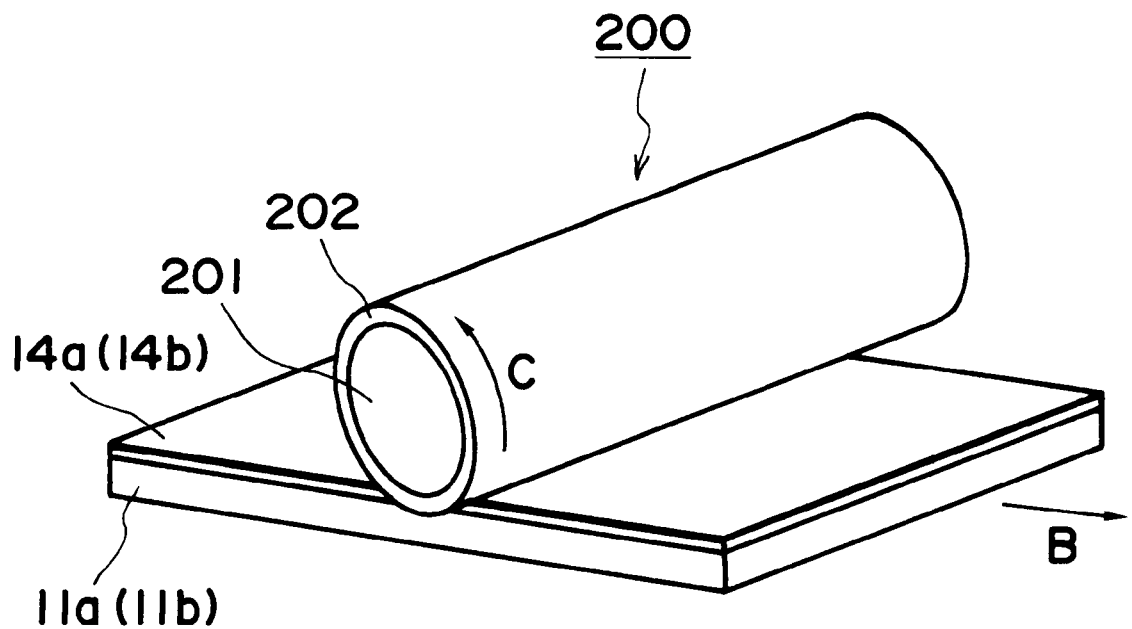
FIG. 2A is a schematic perspective view for illustrating a rubbing treatment adopted in the process for producing a liquid crystal device according to the present invention.
Figure 2B:
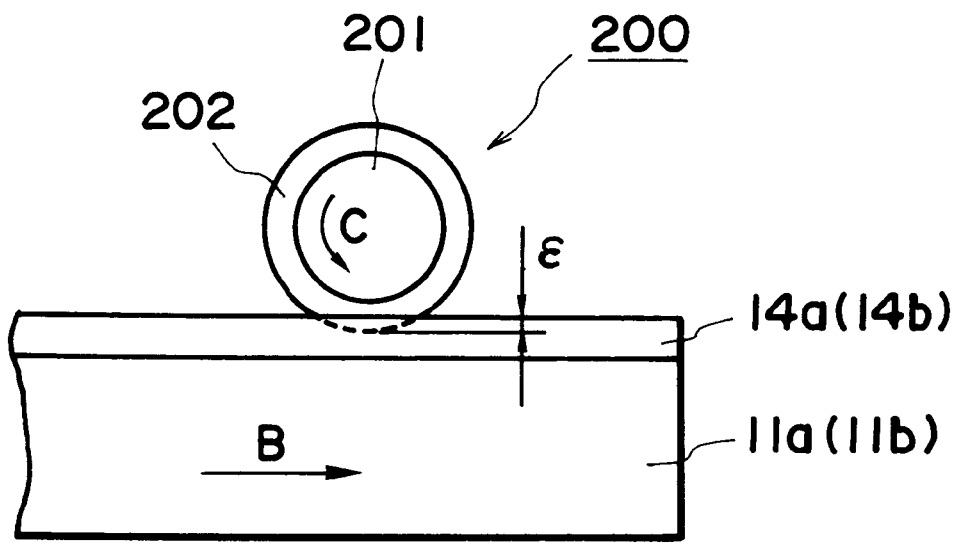
FIG. 2B is a corresponding schematic sectional view for illustrating the rubbing treatment.

FIGS. 2A and 2B schematically illustrate a rubbing apparatus for effecting such a rubbing treatment.

Referring to these figures, the rubbing apparatus includes a rubbing roller 200 comprising a cylindrical roller 201 and a rubbing cloth 202 of, e.g., nylon wound about and attached to the roller 201.

The rubbing roller 200 is pressed or abutted against the alignment control film 14a (14b) formed on the substrate 11a (11b) at a prescribed pressure while rotating the rubbing roller 200 in a direction of an arrow C. In this state, the alignment control film 14a (14b) is rubbed by moving the substrate 11a (11b) (or the rubbing roller 200) in a direction of an arrow B, thus imparting an alignment control force to the alignment control film 14a (14b). The alignment control force is determined by an abutting pressure at the time of abutting or pressing the rubbing roller against the alignment control film 14a (14b). Such an abutting pressure can be controlled by charging a pressing depth $\epsilon$ of the rubbing cloth 202 generally through an upward and downward movement of the rubbing roller 200 to determine a degree of contact between the rubbing cloth 202 and the alignment control film 14a (14b).

When the liquid crystal device of the present invention is used as a color liquid crystal display device, at least one of the substrates 11a and 11b is further provided with a color filter pattern (not shown) comprising plural color filter segments of, e.g., red (R), green (G), blue (B) and white or transparent (W) in the form of dots or lines (elongated forms). The color filter pattern may generally be formed on the substrate 11a (11b) with a stepwise portion between the dots or lines. This stepwise portion may be filled with a flattening layer (not shown) of an inorganic or organic material, as desired, while covering the color filter pattern. Between the color filter dots or lines, a black light-interrupting layer (not shown) of metal or resinous material may preferably be disposed in order to prevent a color mixing of respective colors.

In the color liquid crystal display device as described above, the transparent electrodes 12a (12b) may be formed in a prescribed pattern depending on the shape of the color filter pattern.

Referring again to FIG. 1B, between the pair of substrates 11a and 11b, a plurality of spacers 16 are dispersed or spread at a prescribed density (herein, referred to as "dispersion density") over the entire display panel area so as to provide a change (decrease) in cell gap or dispersion density with an increasing distance from the connecting portion electrically connected with the drive circuit. The cell gap may generally be kept in a range of 0.1–20 $\mu$m, preferably 0.5–3 $\mu$m.

Examples of the spacers 16 may include silica beads, alumina beads, those of a polymeric film, and glass fibers.

In the present invention, in order to further improve a cell gap-regulating function of the spacers 16 in combination of a sealing agent described below and to improve a shock (or impact) resistance of the resultant liquid crystal device, adhesive particles (not shown) may be used in the cell gap.

The pair of substrates 11a and 11b are adhesively bonded to each other with a sealing agent of a thermosetting resin (e.g., epoxy adhesive) at the periphery thereof (not shown), thus defining the cell gap between the substrates 11a and 12b. The cell gap is filled with a liquid crystal (preferably a liquid crystal assuming a chiral smectic phase) 15 (as shown in FIGS. 1A and 1B).

In the case of using the chiral smectic liquid crystal (preferably assuming chiral smectic C phase), a cell gap may preferably be controlled to be a small value sufficient to suppress to be a small value sufficient to suppress the formation of a helical structure of chiral smectic liquid crystal molecules as described above, thus allowing the liquid crystal molecules to show an alignment state including two optically stable states.

The alignment state of the liquid crystal molecules may be controlled by appropriately selecting, e.g., properties of the liquid crystal material 15, a material for the alignment control film 14a (14b) and conditions for the rubbing treatment. For instance, as an alignment control film 14a (14b), it is possible to use a film of a polyimide containing fluorine atom capable of providing a high pretilt angle (an average angle formed by tilted liquid crystal molecules and the surface of the resultant alignment control film) of 10–30 degrees with respect to liquid crystal molecules, thus stably realizing a C1 uniform alignment state providing an excellent performance (e.g., a high contrast) as disclosed in JP-A 3-252624. The C1 uniform alignment state can be further stabilized by effecting a uniaxial aligning treatment (preferably rubbing treatment) to each alignment control film 14a (14b) so that their rubbed directions intersect with each other at an angle of at most 20 degrees.

As the liquid crystal 15, it is possible to use various liquid crystal (or mesomorphic) compounds singly or in combination of two or more species. In the present invention, a chiral smectic liquid crystal composition comprising two or more species of mesomorphic compounds each having a phenyl-pyrimidine skeleton and at least one species of an optically active compound may desirably be used. Such a chiral smectic liquid crystal (composition) may assume cholesteric phase in a temperature range higher than that for (chiral) smectic phase.

In the liquid crystal device of the present invention, an entire region filled with the liquid crystal 15 and enclosed (surrounded) by the sealing agent or its inner region (a region excluding a frame-like region having a width of, e.g., at most 15 mm from the entire region) functions as an effective optical modulation region capable of contributing to an effective optical modulation by the liquid crystal 15 (e.g., a display region in a liquid crystal display device).

Outside the liquid crystal device (the substrates 11a and 11b), a pair of polarizers 17a and 17b are disposed as shown in FIG. 1B.

In the liquid crystal device as shown in FIGS. 1A and 1B according to the present invention, as described above, the cell gap is controlled to be decreased with an increase in a distance from the drive circuit connecting portion of the associated substrate 11a (11b).

In a preferred embodiment, such a control of the cell gap distribution can be performed by uniformly pressing oppositely disposed two substrates under a prescribed condition for the distribution of a dispersion density (the number of spacers per unit area (particles/mm$^2$) including a certain center) as specifically described hereinbelow.

Figure 21:
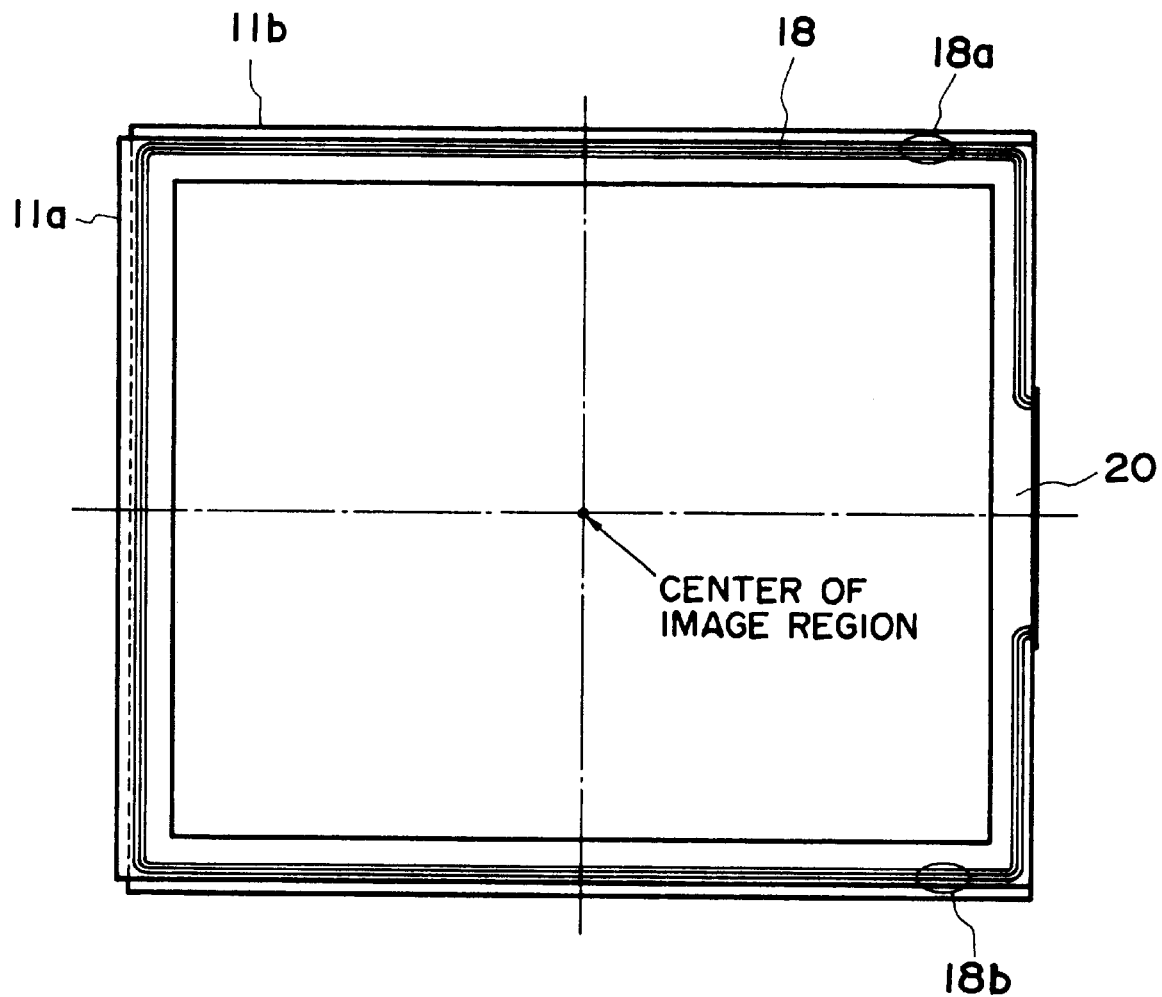
FIGS. 21 and 22 are schematic plan views each showing an embodiment of an arrangement of a sealing agent disposed between a pair of substrates constituting the liquid crystal device of the present invention.
Figure 22:
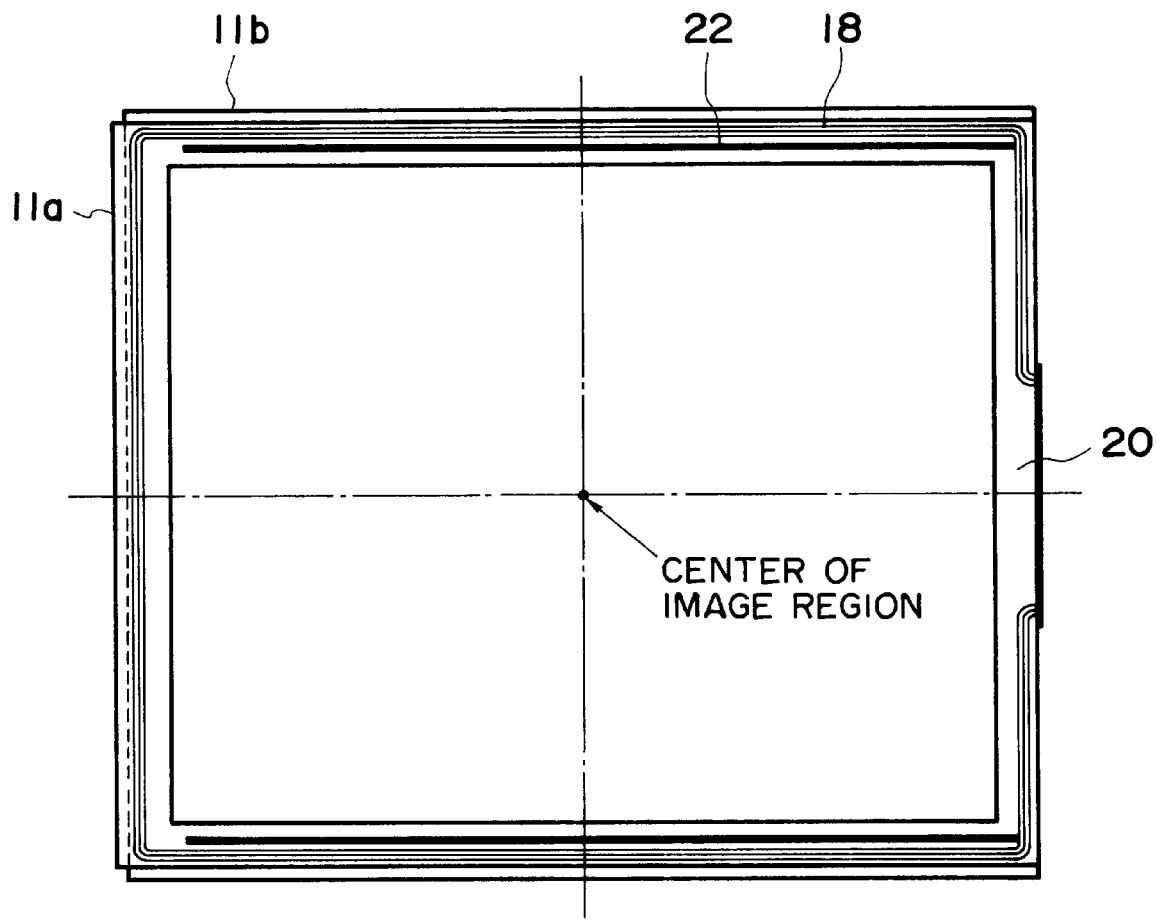

In the case where each substrate 11a (11b) has a side provided with the connecting portion for the drive circuit and an opposite side not provided with the connecting portion, the spacer dispersion density is increased in the vicinity of the connection portion side and is decreased in the vicinity of the opposite side. If each substrate 11a (11b) has two opposite sides each provided with the drive circuit connecting portion, the spacer dispersion density is increased in the vicinity of the opposite sides and is decreased at a central portion therebetween (i.e., in the vicinity of a center of the effective optical modulation region, e.g., a center of display region as shown in FIGS. 21 and 22).

In the liquid crystal device of the present invention, depending on a hardness of respective films formed or each substrate 11a (11b), the resultant cell gap may be determined by a state of the spacers 16 slightly embedded in the contacting film (e.g., the alignment control film 14a (14b)) at the time of, e.g., heating and pressing the substrates 11a and 11b in the production process for producing a liquid crystal device of the present invention as described hereinafter. In this regard, an actual pressure exerted on the cell gap between the substrates 11a (11b) varies depending on the spacer dispersion density in respective positions of the effective optical modulation region of the liquid crystal device, thus correspondingly changing a degree of embedding in the contacting film. As a result, a prescribed cell gap distribution may appropriately be set depending on the varying spacer dispersion density.

More specifically, in the present invention, one side of the effective optical modulation region closer to the drive circuit connecting portion is taken as a reference line (relative distance=0 in FIGS. 6–20) and a distance from the reference line to an opposite side line is taken as a relative distance of 1 (corr. to an entire length of the effective optical modulation region in a longitudinal direction of the associated (scanning or data) electrodes supplied with a (scanning or data) signal voltage from the electrically connected drive circuit).

The dispersion density of the spacers in the effective optical modulation region may preferably be controlled so that the dispersion density in a region having a relative distance of 0–$\frac{1}{10}$ is set to be larger than that in a region having a relative distance of at least $\frac{3}{10}$. In the case where two opposite sides of the substrate 11a (11b) are each provided with the drive circuit, the dispersion density of the spacers in the effective optical modulation region may preferably be controlled so that the dispersion density in regions having a relative distance of 0–$\frac{1}{10}$ and a relative distance of $\frac{9}{10}$–1 are set to be larger than that in at least a region having a relative distance of $\frac{3}{10}$–$\frac{7}{10}$.

The dispersion (or spreading) of the spacers 16 may, e.g., be performed by ejecting the spacers from a nozzle disposed opposite to the substrate 11a (11b) (exactly the alignment control film 14a (14b)) while scanning the effective optical modulation region(or moving the nozzle). In this operation, the scanning (movement) is performed in a direction perpendicular to the above-mentioned reference line (or the side of the substrate connected with the drive circuit) while appropriately adjusting an amount of the spacers ejected from the nozzle or a scanning (moving) speed along with the scanning direction, thus providing a desired distribution of the spacer dispersion density.

When the liquid crystal device having the matrix electrode structure as described above is driven in a multiplexing driving scheme, a scanning selection signal voltage is increased in view of prevention of an occurrence of crosstalk, thus leading to an excessive heat generation from the drive circuit supplying such a voltage to the scanning electrodes.

Accordingly, the above-mentioned control of the cell gap distribution through the setting of the spacer dispersion density is very effective within an entire panel area when the control is applied in a direction perpendicular to the side electrically connected with the drive circuit supplying a voltage to the scanning electrodes (generally in a longitudinal direction of the scanning electrodes).

Then, an example of the process for producing a liquid crystal device according to the present invention will be explained with reference to FIGS. 3, 4, 21 and 22.

Figure 3A:
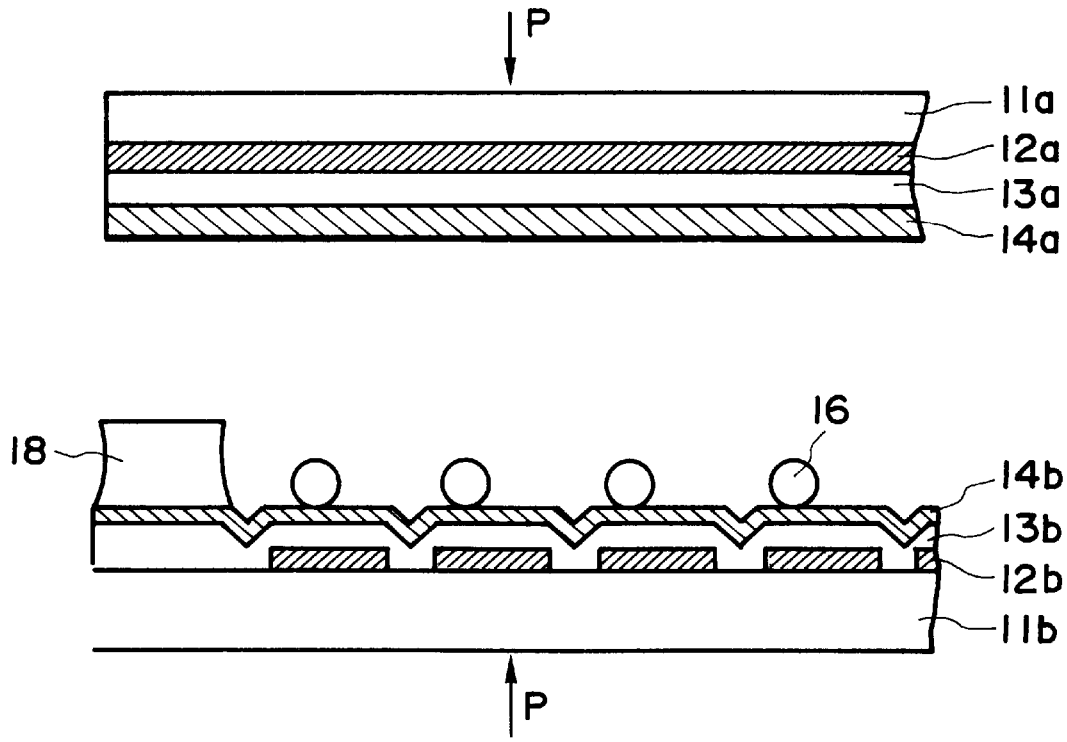
FIGS. 3A and 3B are schematic sectional views for illustrating a step of adhesively bonding a pair of substrates involved in the production process of the present invention.

As shown in FIG. 3A, a pair of substrates 11a and 11b are coated with transparent electrodes 12a and 12b, insulating films 13a and 13b, and alignment control films 14a and 14b, respectively.

Onto the periphery of one of the substrates 11a and 11b (11b in FIG. 3A), a sealing agent 18 is applied by, e.g., printing method so as to enclose (surround) an effective optical modulation region except for a liquid crystal injection port. Thereafter, on either one of the alignment control films 14a and 14b (14b in FIG. 3A) formed on the substrates 11a and 11, a plurality of spacers 16 are dispersed or spread so as to provide a prescribed dispersion density distribution in the above-described manner. In this case, the spacers 16 may be dispersed or the other alignment control films 14a.

Figure 3B:
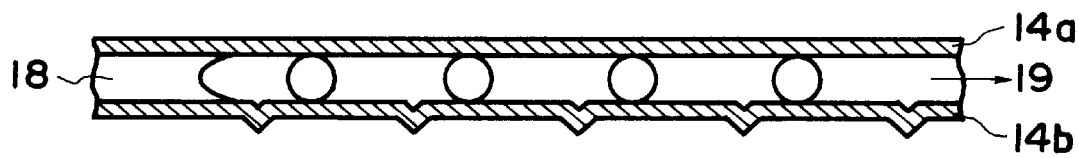

Then, the pair of substrates 11a and 11b thus treated are oppositely disposed and adhesively bonded to each other via the sealing agent 18 and the spacers 16 under heating and application of a pressure P, thus curing the sealing agent to prepare a blank cell (FIGS. 3A and 3B).

In FIG. 3B, the liquid crystal injection port is located on the right-hand side of the figure. The corresponding plan view illustrating such a structure is shown in FIG. 21. In FIG. 21, a reference numeral 20 denotes an liquid crystal injection port.

Into the blank cell, a liquid crystal is injected through the liquid crystal injection port, which is then sealed up with a material identical to that for the sealing agent 18. Thereafter, a heat treatment to the liquid crystal within the liquid crystal panel may be effected, as desired. Then, to the associated electrodes, a drive circuit (e.g., a driver IC) is electrically connected at prescribed side(s) of the associated substrate (not shown).

Referring again to FIG. 3B, in the above process, particularly in the step of heating and pressing the pair of substrates 11a and 11, heated air present in a spacing (cell gap) between the substrates 11a and 11 can generally be evaluated successively to the outside of the liquid crystal device through the injection port in a direction of an arrow 19.

Figure 4:
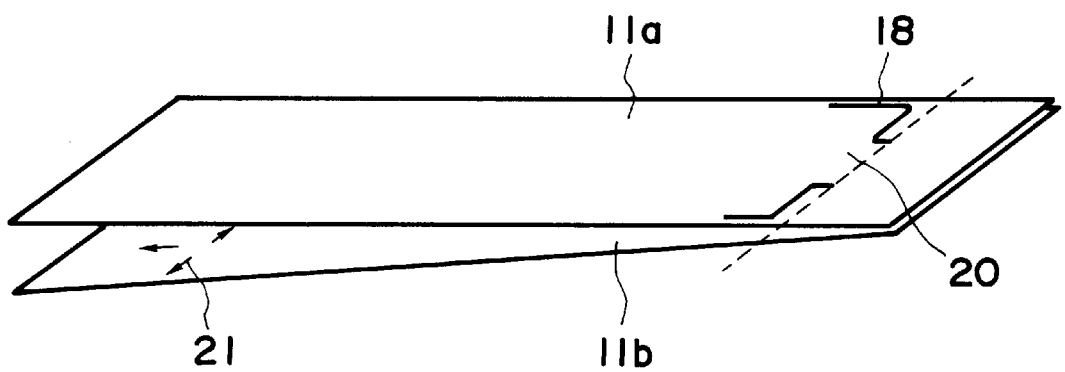
FIG. 4 is a schematic perspective view for illustrating a state of evacuation of air within a cell gap of the liquid crystal device of the present invention.

In this instance, as shown in FIG. 4, in the case where the liquid crystal injection port 20 (free from the sealing agent 18) is provided to a position closer to the side where the cell gap is set to be smaller and has a width (opening length) of at most 3/10 of a length of the side, heated air 21 between the substrates 11a and 11b cannot be quickly evacuated therefrom to the outside via the injection port 20 in some cases. Such heated air 21 exerts pressure on a sealing portion (wall) of the sealing agent 18, thus being liable to damage or break the sealing portion. In this regard, referring to FIG. 21, when the cell gap is larger on the left-hand side of the figure, a part 18a and/or 18b of the sealing portion 18 can be damaged by excessively expanded heated air 21 remaining in the spacing between the substrates 11a and 11b (by the air 21 not evaluated to the outside). As a result, a stable production process of the liquid crystal device is impaired, thus adversely affecting performances (e.g., a liquid crystal aligning performance) of the resultant liquid crystal device in some cases.

In view of this problem, in the present invention, the sealing agent 18 may preferably be disposed on the periphery of the associated substrate 11a (11b) so as to provide a first sealing portion enclosing the effective optical modulation region except for the liquid crystal injection port 20 and a second sealing portion disposed inside the first sealing portion. For instance, as shown in FIG. 22, a second sealing portion 22 is disposed inside and parallel to one side of a first sealing portion 18 enclosing the effective optical modulation region excluding the injection port 20. The second sealing portion 22 may comprise a material identical to or different from that for the first sealing portion 18.

The arrangement of the sealing agent providing the first and second sealing portions 18 and 22 in FIG. 22 may particularly suitably be used in the case of the larger cell gap on the left-hand side of the figure.

In the present invention, when the liquid crystal device as described above is used for constituting a liquid crystal display apparatus for effecting display by utilizing ordinary transmitted light or including a light source (illumination means) emitting a uniform planar light disposed outside either one of the substrates 11a and 11b, a yellowing phenomenon due to an excessive chromaticity distribution within the effective optical modulation region can be caused in a region (particularly in the vicinity of the drive circuit connecting portion) where the cell gap is relatively large particularly if an average cell gap or a difference between a maximum cell gap and a minimum cell gap is large.

Accordingly, in the case where the liquid crystal device (panel) of the present invention is used as a transmission-type liquid crystal display device for a liquid crystal display apparatus, an illumination means (e.g., a backlight device or unit) for illuminating the liquid crystal device with a planar light having a prescribed chromaticity distribution by itself by, e.g., using plural lamps providing different emission peak wavelengths may preferably be disposed behind the liquid crystal device in order to counterbalance or compensate the above-mentioned excessive chromaticity distribution due to the cell gap distribution within the effective optical modulation region of the liquid crystal device. As a result, it becomes possible to minimize an unevenness of a chromaticity in the vicinity of the drive circuit connecting portion for the transparent electrodes and/or the data electrodes while improving a display quality by uniformizing a drive characteristic within the effective optical modulation region of the liquid crystal device.

Hereinbelow, the present invention will be described more specifically based on Experimental Examples.

A liquid crystal device (used as Devices 1–10 in the following Experimental Examples) having a cell structure as shown in FIG. 1 was principally prepared in the following manner.

Two 1.1 mm-thick glass substrate 11a and 11b (ca. 270×320 mm) were each coated with 1500 Å-thick transparent electrodes 12a (12b) by sputtering, followed by patterning through a photolithographic process to form in a stripe pattern (width=170 μm, spacing=30 μm).

On each transparent electrodes 12a (12b), a 900 Å-thick insulating film 13a (13b) of $Ta_2O_5$ for preventing short circuit was formed by sputtering, an thereon, a 1200 Å-thick (after drying) insulating layer of TiSi=1:1 (mfd. by Tokyo Ohka Kogyo K.K.) for improving a surface state was formed by wet coating and hot-baking at 300° C.

Thereafter, on each TiSi layer, a 1.5 wt. %-solution of polyamide acid ("LQ1802", mfd. by Hitachi Kasei Kogyo K.K.) in a mixture solvent of NMP (N-methylpyrrolidone)/nBC (n-butyl cellosolve)=1/1 was applied by spin coating at 2000 rpm for 20 sec., followed by hot-baking at 270° C. for 1 hour to form a 200 Å-thick alignment control film 14a (14b), which was then subjected to a rubbing treatment by using a rubbing apparatus as shown in FIGS. 2A and 2B.

The rubbing of the alignment control film 14a (14b) was performed two times under the conditions including a pressing depth ε of 0.35 mm, a roller rotating rate of 1000 rpm and a roller feed speed of 30 mm/sec.

On one of the thus-treated glass substrates 11a and 11b, silica beads 16 having an average particle size of 1.2 μm were dispersed at a prescribed dispersion density distribution. On the periphery of the other glass substrate 11a (or 11b), a sealing agent 18 of epoxy resin adhesive was disposed in a prescribed pattern by using a dispenser.

The thus-treated glass substrate 11a and 11b were adhesively bonded to each other at 160° C. for 1 hour under a pressure of 1 kg/cm² to effect curing of the epoxy resin adhesive, thus preparing a blank cell. In this step, the transparent electrodes 12a and 12b were arranged to form an electrode matrix structure and the rubbing axis directions were arranged in parallel with and identical to each other.

The thus-prepared blank cell had a cell structure shown in FIG. 21. The blank cell had a ca. 0.27 mm-wide sealing portion 18 having an area of ca. 257×315 mm. A liquid crystal injection port 20 free from the sealing portion 18 was set to have a length of 1/3 of the length (ca. 257 mm) of the corresponding side of the sealing portion 18.

Then, into the blank cell, a phenyl-pyrimidine-based ferroelectric liquid crystal (composition) having the following properties was injected at its isotropic phase temperature under reduced pressure by utilizing a capillary action, followed by gradual cooling to room temperature to prepare a liquid crystal device.

Phase transition temperature (° C.)

$$\text{Cryst.} \xrightarrow{-8.3} \text{SmC}^* \xrightarrow{67.3} \text{SmA} \xrightarrow{91.7} \text{Ch.} \xrightarrow{100.1} \text{Iso.}$$

Cryst.: crystal phase,

SmC*: chiral smectic C phase,

SmA: smectic A phase,

Ch.: cholesteric phase,

Iso.: isotropic phase.

Tilt angle $\theta$ (at 30° C.) = 15.1 degrees

Spontaneous polarization Ps (at 30° C.)

$$= 5.5 \ (nC/cm^2)$$

Reference index anisotropy $\Delta n = 0.2$

The thus prepared liquid crystal device had an effective optical modulation region of ca. 235×294 mm.

With respect to the liquid crystal device, respective transparent electrodes 12a and 12b were electrically connected with associated driver IC(s) for supplying a scanning signal voltage or a data signal voltage thereto at one or two associated connecting portions so that one of the transparent electrodes and the other transparent electrodes 12a (or 12b) function as scanning electrodes and data electrodes, respectively.

EXPERIMENTAL EXAMPLE 1

Figure 6A:
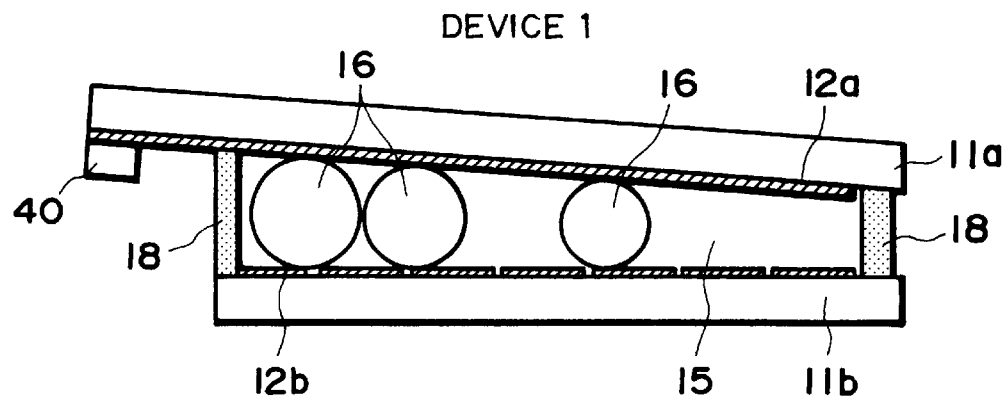
FIGS. 6A, 8A and 10A are schematic sectional views of Device 1 (FIG. 6A), Device 2 (FIG. 8A) and Device 3 (FIG. 10A), respectively, used in Experimental Examples.
Figure 6B:
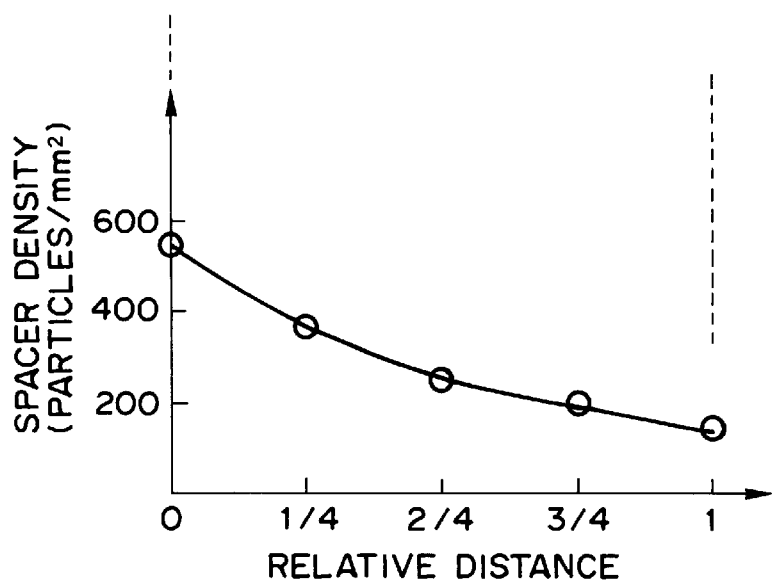
FIGS. 6B, 8B and 10B are graphs each showing a relationship between a relative distance from a connecting portion for a drive circuit and a dispersion (spreading) density of spacers.
Figure 6C:
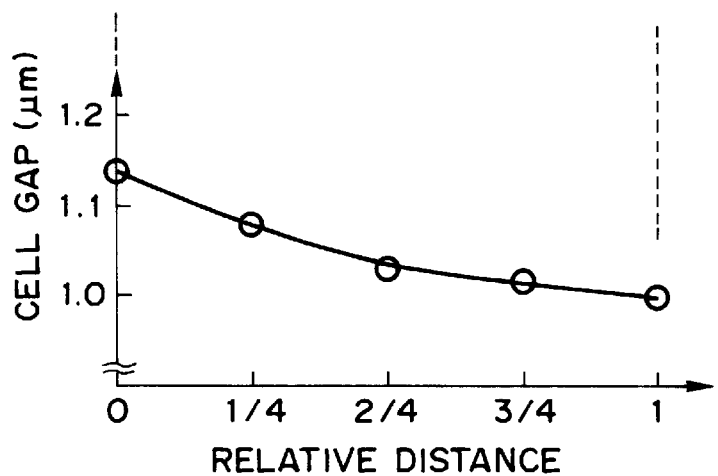
FIGS. 6C, 8C and 10C are graphs each showing a relationship between a relative distance and a cell gap.
Figure 8A:
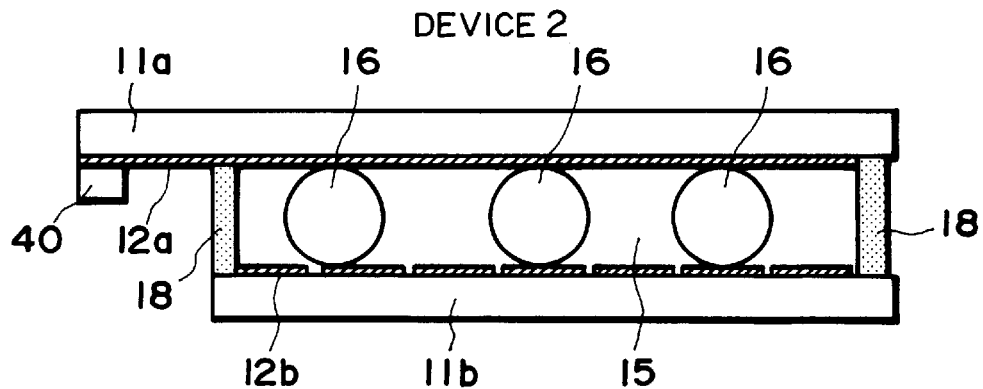
Figure 8B:
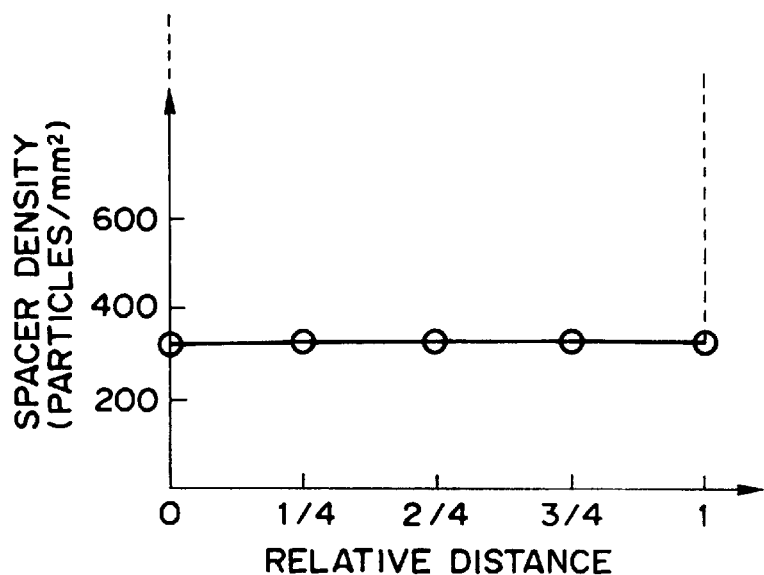
Figure 8C:
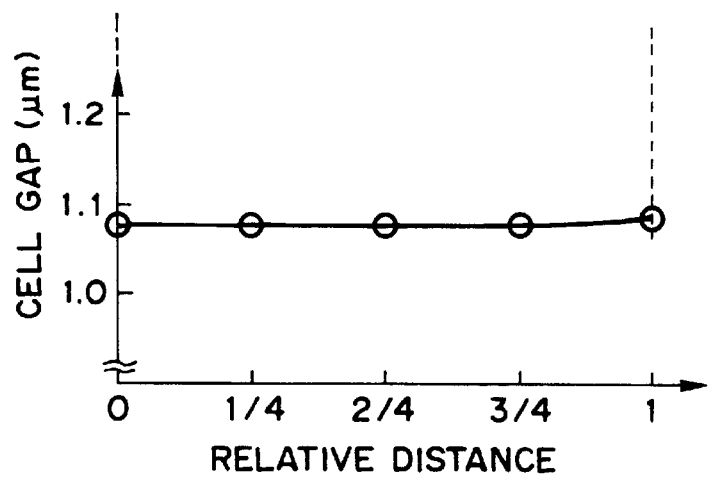

In this experimental example, Device 1 having a simplified structure, a change in spacer dispersion density and a change in cell gap as shown in FIGS. 6A, 6B and 6C, respectively and, Device 2 as shown in FIGS. 8A, 8B and 8C were prepared and evaluated.

More specifically, referring to FIGS. 6A and 8A, the substrate 11a provided with the transparent electrodes as scanning electrodes was electrically connected with a driver IC 40 at a connecting portion on one side of the substrate 11a. In this experimental example, a relative distance (taken as the abscissa of FIGS. 6B, 6C, 8B and 8C) was determined by taking an entire length of the effective optical modulation region in the scanning electrode extension direction (294 mm) as a relative distance of "1" based on a reference line (relative distance of "0") corr. to one side of the effective optical modulation region closer to the driver IC 40.

For measurement of a dispersion density of the spacers 16 (particles/mm$^2$) (FIGS. 6B and 8B) and a cell gap ($\mu$m) (FIGS. 6C and 8C), respective values at a particular one relative distance (e.g., of ¼) were each taken as an average value of those measured at 5 points having an identical relative distance (along with the scanning electrode extension direction) and each having an identical spacing therebetween (235/4 (mm)) in a direction perpendicular to the scanning electrode extension direction. In other words, 25 points in total subjected to measurement of the dispersion density or the cell gap were equally spaced away from each other with a spacing in the scanning electrode extension direction of 294/4 (mm) and a spacing in its perpendicular direction of 235/4 (mm) within the entire effective optical modulation region.

With respect to the cell gap measurement, values of a retardation at the 25 measuring points were measured by using a retardation measurement apparatus ("RA100", mfd. by Olympus Optical Co., Ltd.) and, based on these values, 5 average values at five relative distances (0, ¼, 2/4, ¾, 1) were determined and plotted in FIGS. 6C and BC, respectively.

As apparent from FIGS. 6A–6C, Device 1 showed a cell gap-changing characteristic such that a cell gap was decreased with an increasing distance (relative distance) from the reference line of the effective optical modulation region where the connecting point was provided based on a decrease in the spacer dispersion density with the increasing distance.

On the other hand, as apparent from FIGS. 8A–8C, Device 2 showed no cell gap-changing characteristic since Device 2 had substantially uniform spacer dispersion density and cell gap.

Figure 5A:
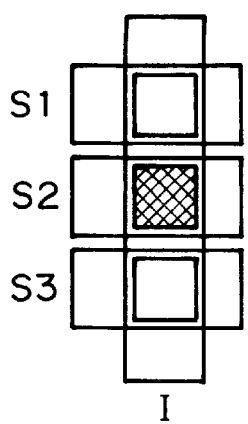
FIG. 5A illustrates a matrix display state adopted in Experimental Examples appearing hereinbelow.
Figure 5B:
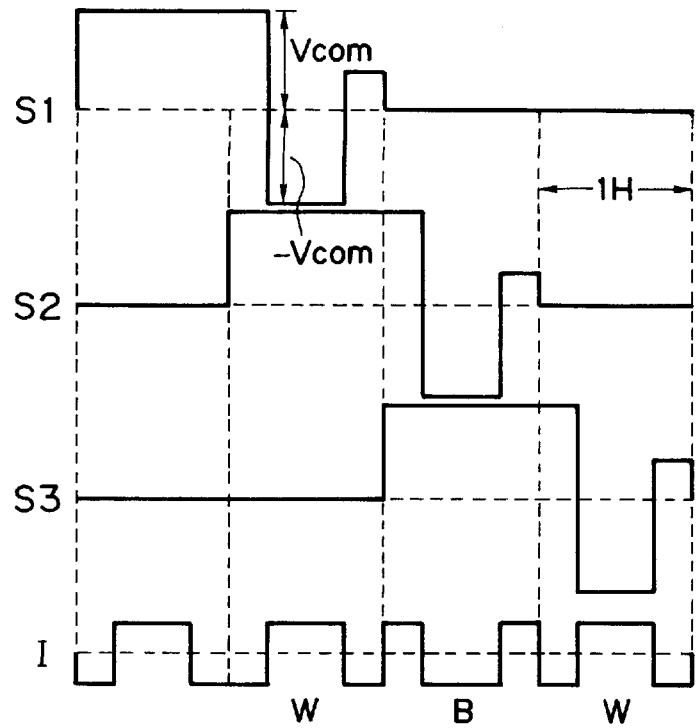
FIG. 5B is a set of drive waveforms providing such a display state shown in FIG. 5A.
Figure 5C:
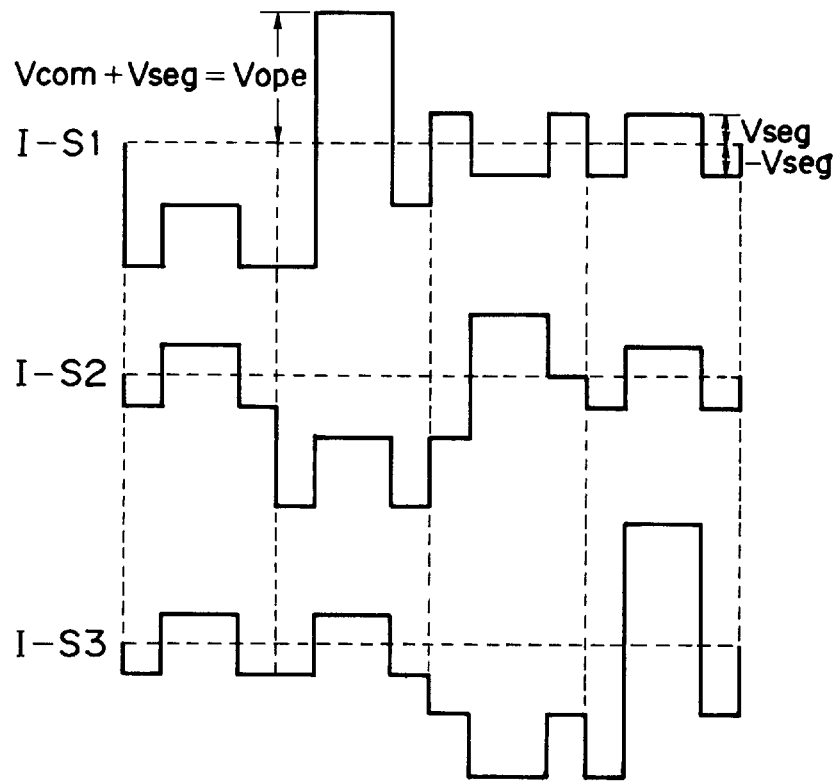

The thus prepared Devices 1 and 2 were each then driven at 20° C. by using a drive waveform as shown in FIGS. 5B and 5C for effecting a matrix display (W (white) and B (black)) as shown in FIG. 5A under the driving conditions including Vcom=14.1 volts, Vseg=5.9 volts, Vope=Vcom+Vseg=20.0 volts, and a bias ratio of 5.9/20.

Figure 9A:
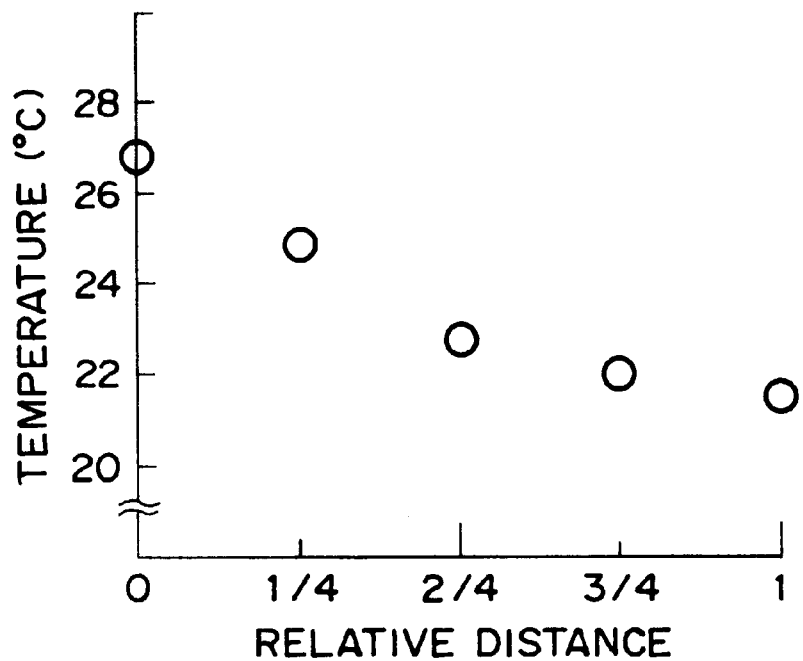
Figure 9B:
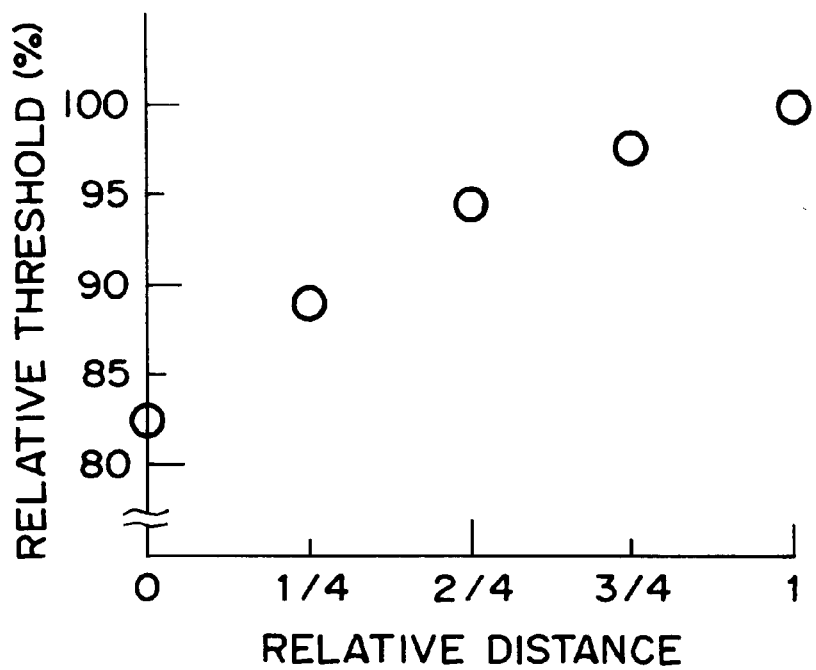

At this time, measurements of a temperature (° C.) and a relative threshold (%) obtained by changing a pulse width of a drive voltage (Vope) and based on a reference value of "100%" at the relative distance of "1" (taken in the same manner as in those for the dispersion density and cell gap) were performed, whereby the results shown in FIGS. 7A and 7B (for Device 1) and FIGS. 9A and 9B (for Device 2) were obtained.

As apparent from these figures, compared with Device 2, Device 1 was found to alleviate a change in temperature (° C.), thus substantially uniformizing the relative threshold (%) within the entire effective optical modulation region. In this regard, Device 1 showed a difference in a maximum temperature and a minimum temperature ($\Delta$T) of 3.9 ° C., whereas Device 2 is showed a $\Delta$T of 4.9° C.

Further, when a display state of W (white) or B (black) was observed by eyes at 25 square regions (each 10×10 mm) including the above-mentioned 25 measuring points, Device 1 showed a uniform display state with respect to all the regions but Device 2 showed a display irregularity (at least one nonuniform display region) in the vicinity of the driver IC connecting portion for the scanning electrodes. Accordingly, Device 1 was found to be also effective in improving a display irregularity particularly in the vicinity of the driver IC connecting portion.

The above advantageous effects of Device 1 as shown in FIGS. 6A–6C (according to the present invention) may presumably be brought about by providing Device 1 with the above-described cell gap-charging characteristic, particularly a larger cell gap in a region in the vicinity of the driver IC connecting portion for the scanning electrodes, to decrease a capacitance as the liquid crystal device leading to a decreased current passing across the region, thereby suppressing an increase in amount of eat generation. As a result, the adverse affect of the heat generation of the driver IC may presumably be compensated by the cell gap-changing characteristic of Device 1.

EXPERIMENTAL EXAMPLE 2

Figure 10A:
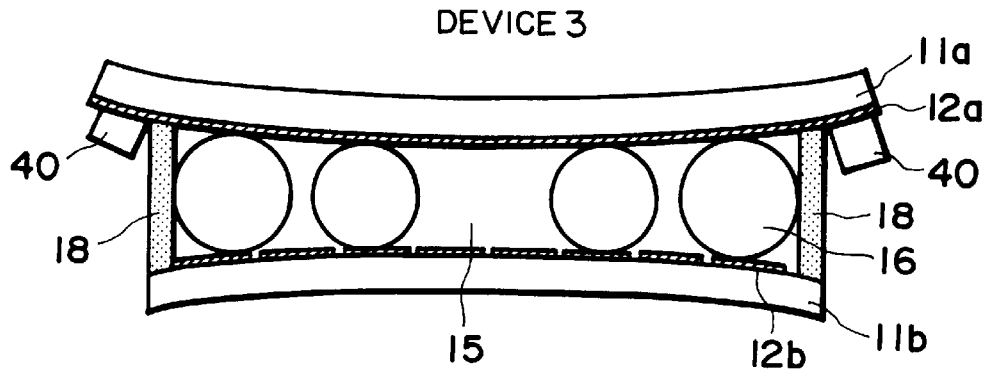
Figure 10B:
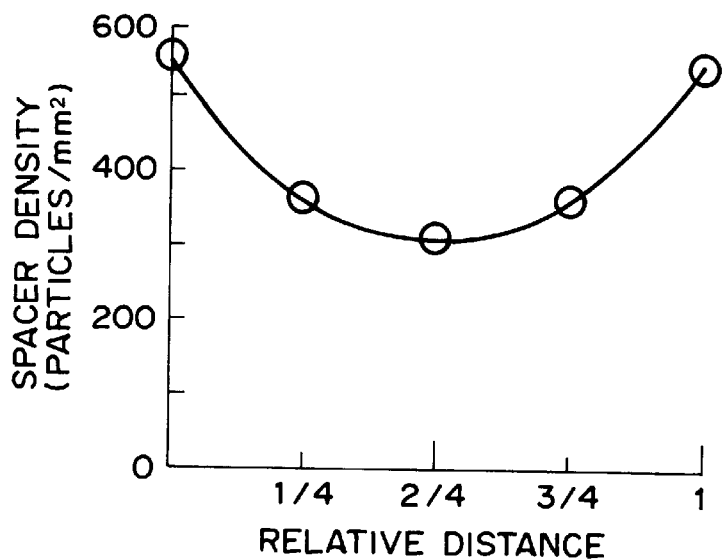
Figure 10C:
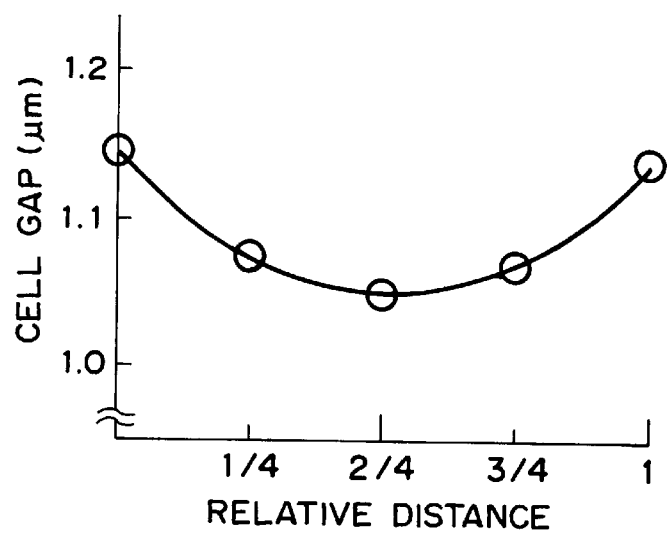

In this experimental example, Device 3 as shown in FIGS. 10A–10C and Device 4 as shown in FIGS. 8A–8C except that another driver IC 40 was provided on the opposite side of the substrate 11a (right-hand side in FIG. 8A) were prepared and were evaluated in the same manner as in Experimental Example 1.

As apparent from FIGS. 10A–10C, Device 3 showed a cell gap-changing characteristic such that a cell gap was decreased with an increasing distance (relative distance) to an intermediate region (relative distance of 2/4) and was then increased to a region (relative distance of 1) based on a similar characteristic of the spacer dispersion density.

On the other hand, as apparent from FIGS. 8B and 8C, Device 4 showed no cell gap-changing characteristic.

Figure 11A:
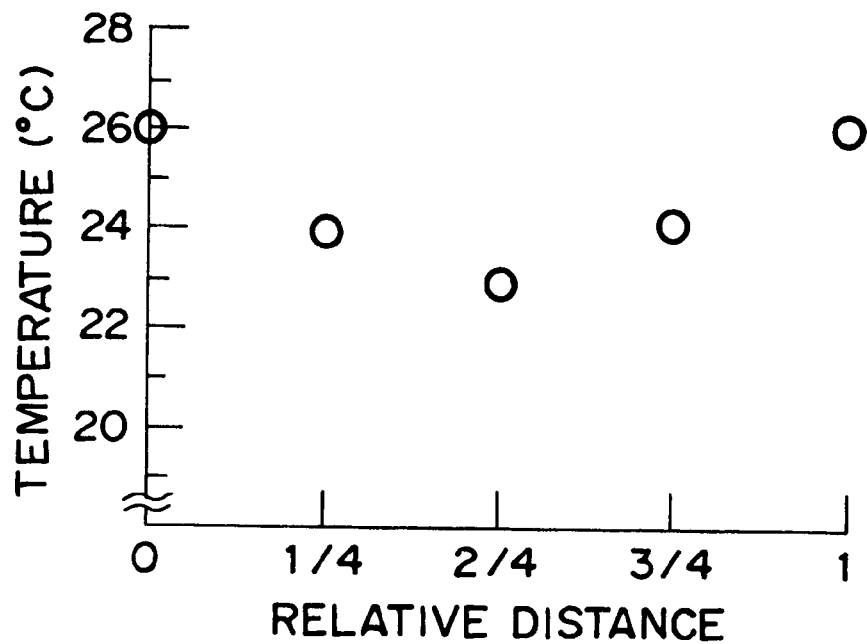
Figure 11B:
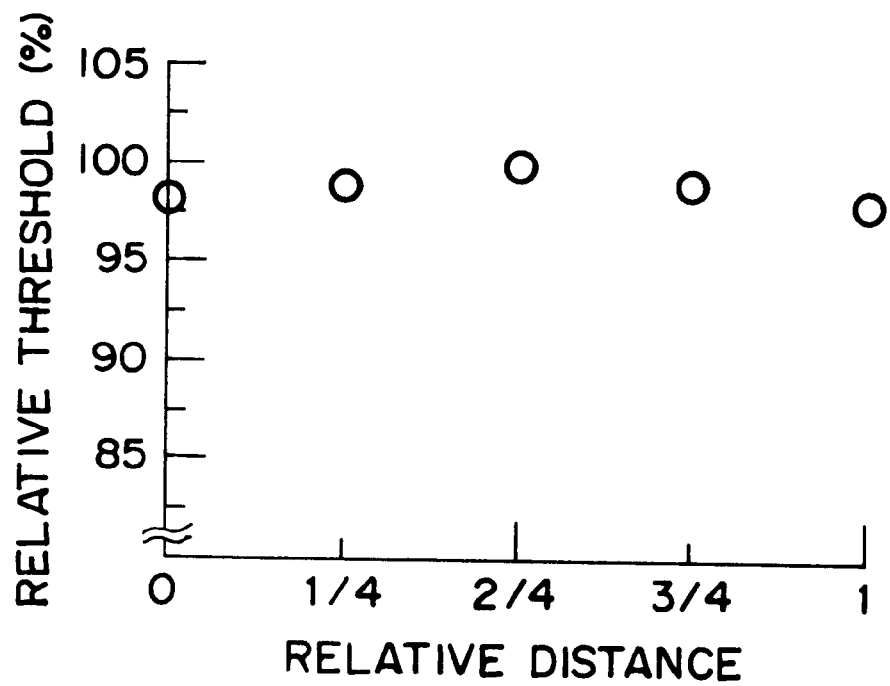
Figure 12A:
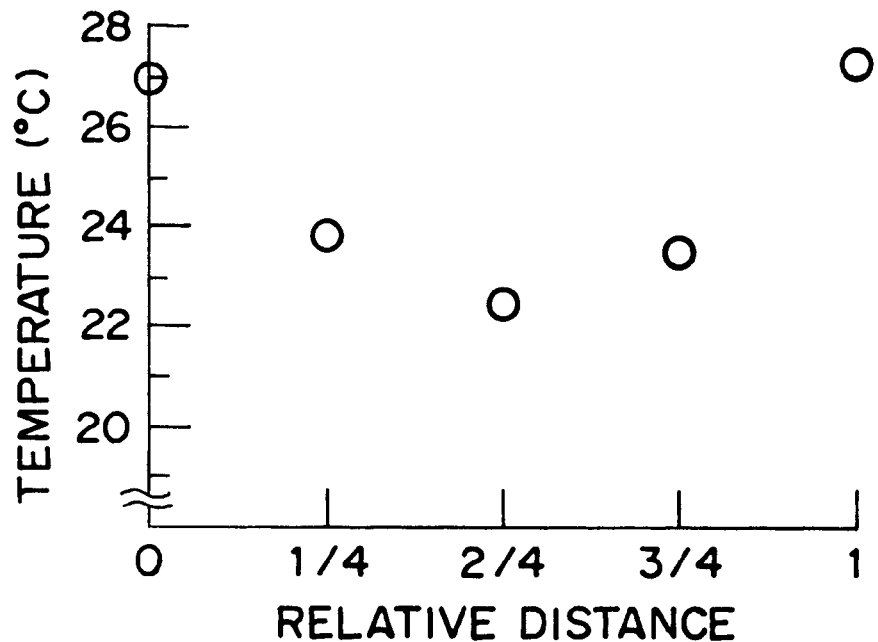
Figure 12B:
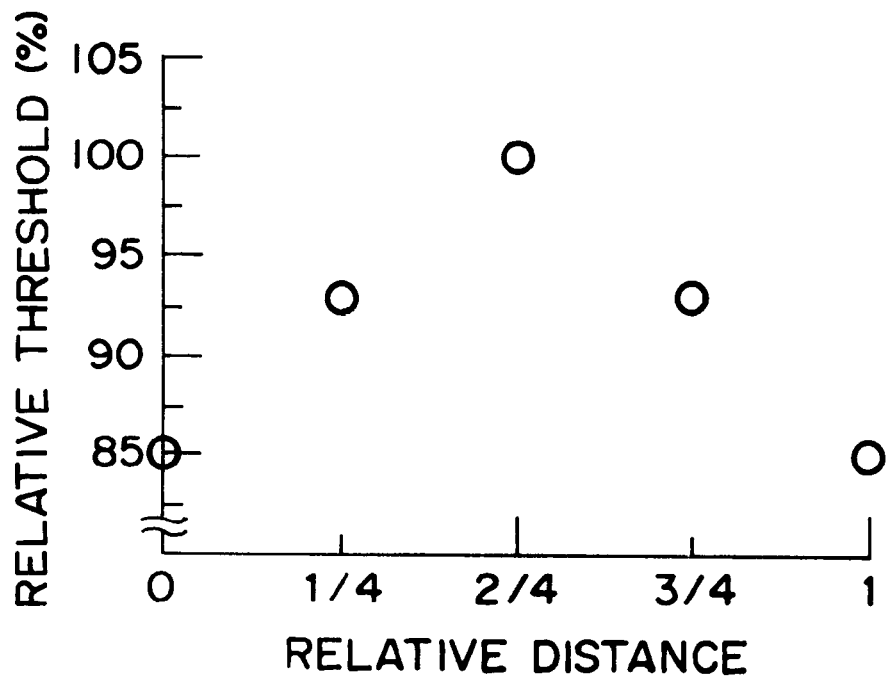

The evaluation results are shown in FIGS. 11A and 11B (for Device 3) and FIGS. 12A and 12B (for Device 4), respectively.

When the results of FIGS. 11A and 11B were compared with those of FIGS. 12A and 12B, Device 3 having the cell gap-changing characteristic described above (FIG. 10C) and electrically connected with the oppositely disposed two driver IC 40 (FIG. 10A) was found to alleviate a change in temperature (FIG. 11A), thus substantially providing a uniformized relative threshold (FIG. 11B).

Further, Device 3 did not show a display irregularity similarly as in Device 1 but Device 4 showed a display irregularity similarly as in Device 2.

With respect to Devices 1 and 3 prepared in Experimental Examples 1 and 2, by providing a similar cell gap-changing characteristic in a direction perpendicular to the scanning electrode extension direction (i.e., the data electrode extension direction), it becomes possible to further stabilize drive and display performances over the entire effective optical modulation region of Devices 1 and 3 according to the present invention.

EXPERIMENTAL EXAMPLE 3

Devices 5–10 were prepared in the same manner as in Device 1 (Experimental Example 1) except that the spacer drive circuit and cell gap in the scanning electrode extension direction were changed so as to provide a prescribed degree of cell gap change shown in Table 1 below.

The thus prepared Devices 5–10 showed similar tendencies as to the dispersion density distribution and the cell gap distribution as those for Device 1 as shown in FIGS. 6B and 6C.

The degree of cell gap change was determined as a ratio of a difference of a maximum cell gap ($d_{max}$) (at a point having a relative distance of "0") and a minimum cell gap ($d_{min}$) (at a point having a relative distance of "1") to an average cell gap, as represented by the following formula (I):

$$(d_{max} - d_{min}) \times 100/[(d_{max} + D_{min})/2] (\%) \quad (I)$$

Devices 5–10 prepared above and Device 2 prepared in Experimental Example 1 were evaluated in terms of the degree of cell gap change (%), display :-irregularity and yellowing phenomenon.

The results are shown in Table 1.

TABLE 1

| Device No. | $\frac{(dmax - dmin)}{(dmax + dmin)/2} \times 100\ (\%)$ | Display*1 irregularity | Yellowing*2 |
|---|---|---|---|
| 2 | 0 | B | A |
| 5 | 5 | A | A |
| 6 | 8 | A | A |
| 7 | 10 | A | A |

TABLE 1-continued

| Device No. | $\frac{(dmax - dmin)}{(dmax + dmin)/2} \times 100\ (\%)$ | Display*1 irregularity | Yellowing*2 |
|---|---|---|---|
| 8 | 20 | A | A |
| 9 | 30 | A | B |
| 10 | 50 | A | C |

*1: Evaluated in the same manner as in Experimental Example 1 except that the display state was observed in the vicinity of the driver IC connecting portion.
A: No nonuniform display state was observed.
B: Nonuniform display state was observed.
*2: Evaluated as a region in which yellowing phenomenon occurred.
A: Occurred only in a region having a relative distance of 0–5/100.
B: Occurred in a region having a relative distance of 0–10/100.
C: Occurred in a region having a relative distance of 0–20/100.

As apparent from the results shown in Table 1, it was possible to improve the display irregularity by setting the degree of cell gap change of the formula (I) to at least 5%, i.e., (dmax−dmin)×100/[(dmax+dmin)/2]≧5%.

Similarly, it was also possible to minimize the yellowing phenomenon by setting the degree of cell gap change of the formula (I) in a range of 5–30%, i.e., 30%≧(dmax−dmin)×100/[(dmax+dmin)/2]≧5%.

According to our further experiment, in a 15 inch (diagonal length)-display panel, it was found that a maximum dispersion density (Smax) and a minimum dispersion density (Smin) were preferred to satisfy the relationship: Smax/Smin≧2 in order to provide the above relationship:

$$(d\text{max} - d\text{min}) \times 100/[(d\text{max} + d\text{min})/2] \geq 5\%.$$

EXPERIMENTAL EXAMPLE 4

In this experimental example, a method or means for suppressing the color-changing (yellowing) phenomenon within the effective optical modulation region of a liquid crystal device when a cell gap distribution as described above was set was investigated.

Devices 1 and 3 prepared in Experimental Examples 1 and 2, respectively, were subjected to measurement of a chromaticity distribution (based on CIE-XYZ color system) in the scanning electrode extension direction by using a measurement apparatus ("BM-7", mfd. by Topcon Co.) under the condition that each device was used in combination with a backlight (illumination means) of uniform planar light-type providing a central luminance (of the effective optical modulation region) of 100 cd/cm² at room temperature and each measurement point was set to have a spot diameter of 5 mm.

Figure 13A:
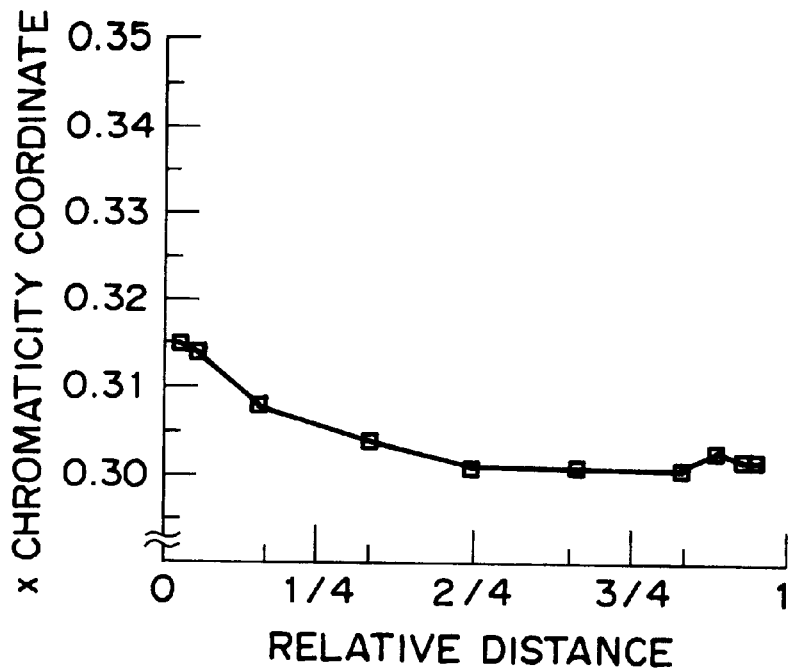
FIGS. 13A, 14A, and 16A to 20A are graphs each showing a relationship between a relative distance and x chromaticity coordinate in Experimental Examples.
Figure 13B:
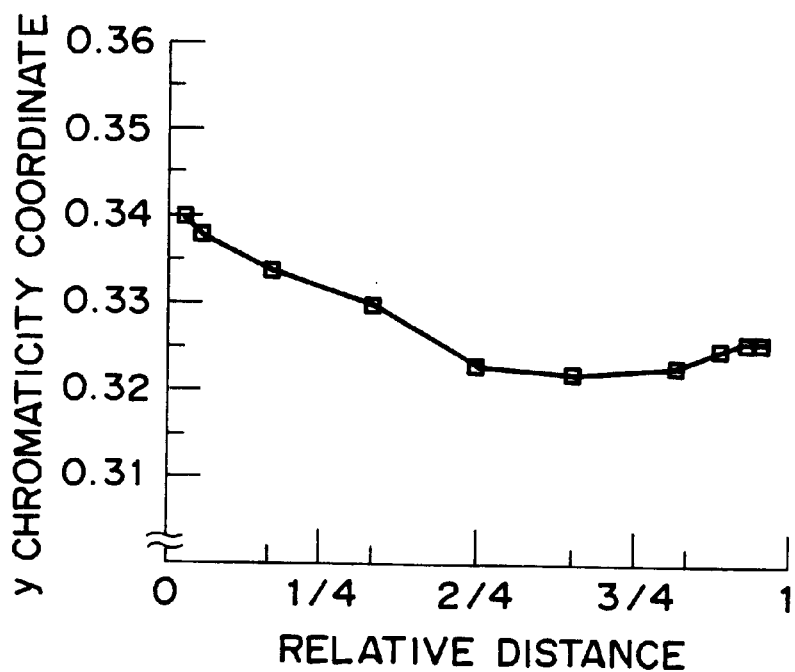
FIGS. 13B, 14B an 16B to 20B are graphs each showing a relationship between a relative distance and y chromaticity coordinate in Experimental Examples.
Figure 14A:
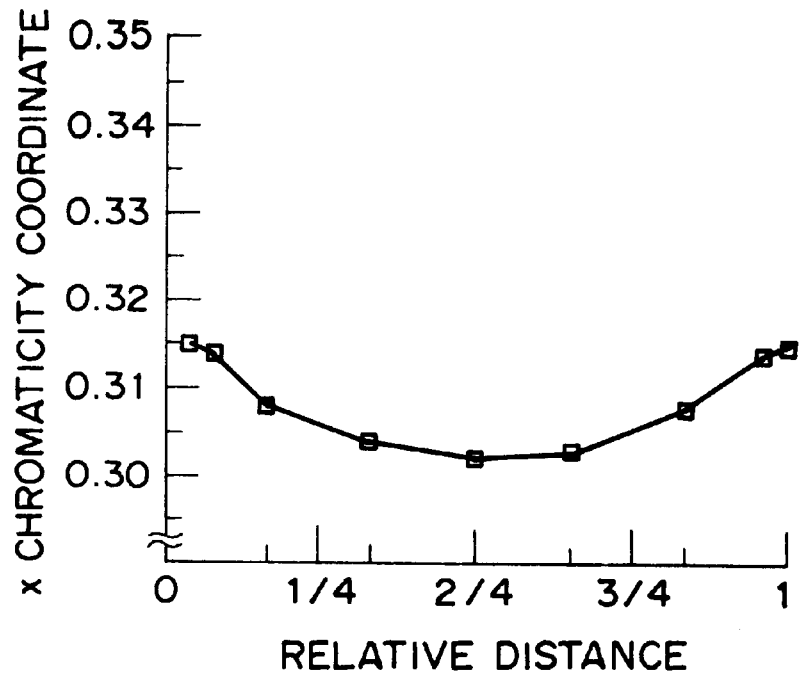
Figure 14B:
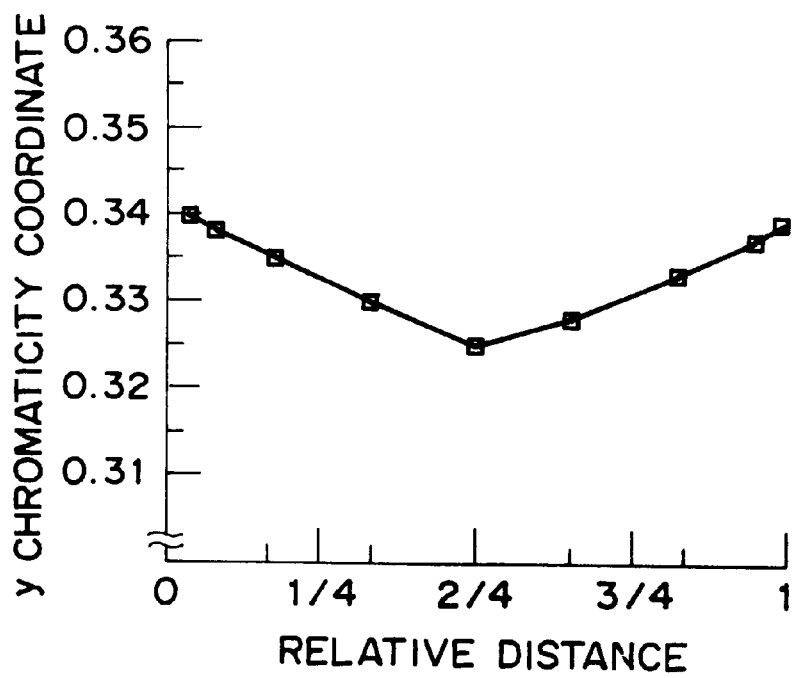

The results are shown in FIGS. 13A and 13B (for Device 1) and FIGS. 14A and 14B (for Device 3), respectively, wherein FIGS. 13A and 14A each represented a chromaticity distribution for x chromaticity coordinate and FIGS. 13B and 14B each represented a chromaticity distribution for y chromaticity coordinate. In each figure, the abscissa represented the "relative distance" as described above.

As apparent from the results shown in these figures and those shown in FIGS. 6C and 10C, Devices 1 and 3 were found to show a chromaticity distribution corresponding to the cell gap-changing characteristics shown in FIGS. 6C and 10C, respectively.

Figure 15:
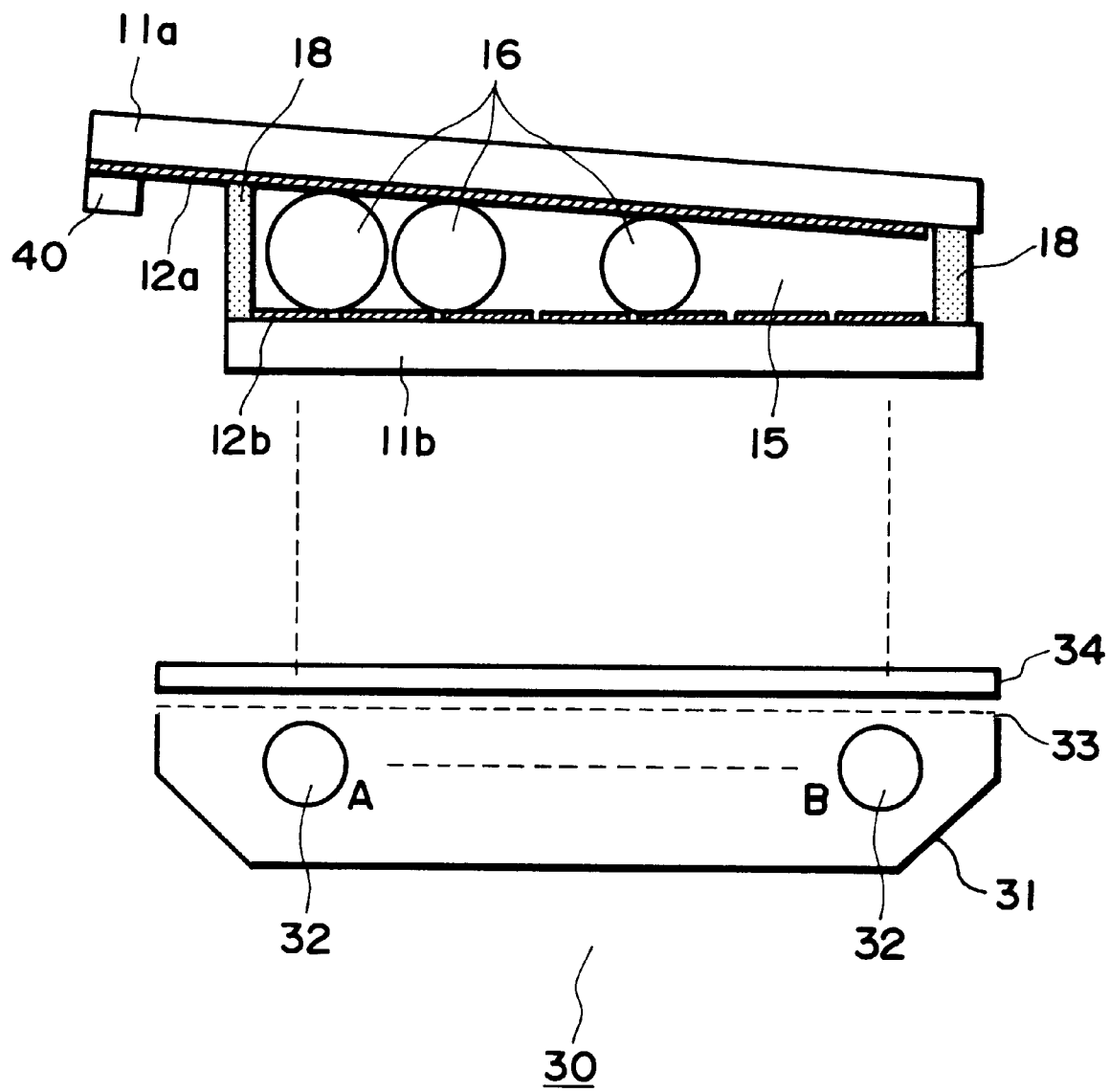
FIG. 15 is a schematic view of an embodiment of an arrangement of a liquid crystal device and a backlight device used in Experimental Example 4.

Then, behind Devices 1 and 3, a backlight 30 was disposed as shown in FIG. 15. In this figure, a combination of Device 1 and the backlight was illustrated.

The backlight 30 included a housing 31 enclosing a plurality of lamps 32 arranged in the scanning electrode extending direction so that their longitudinal directions were parallel to the substrate side where the scanning electrode drive circuit was provided. These lamps 32 were selected so as to provide different chromaticities from a position A to a position B depending on a corresponding cell gap-changing characteristic by changing, e.g., wavelength characteristics of the respective lamps. Between the device (Device 1 or 3) and the lamps 32, a lighting curtain 33 and a diffusion plate 34 were disposed.

Figure 16A:
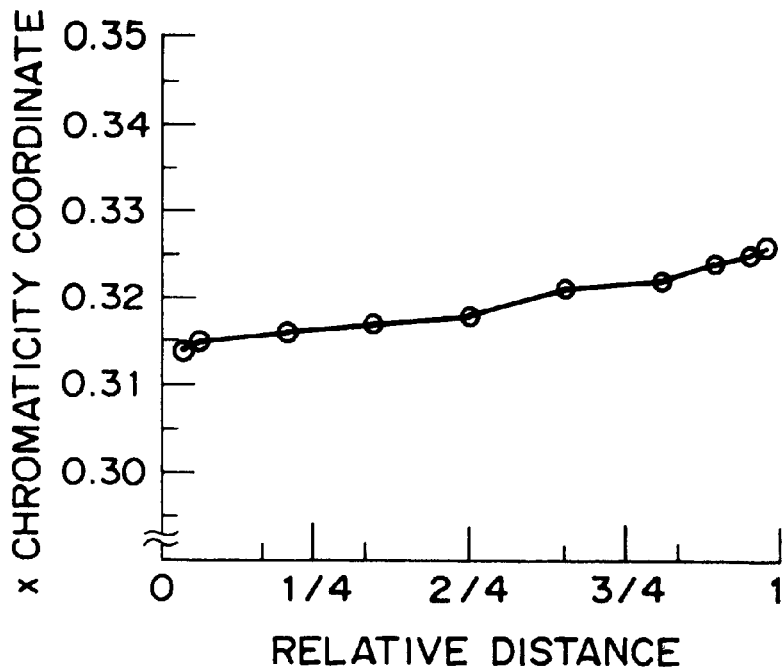
Figure 16B:
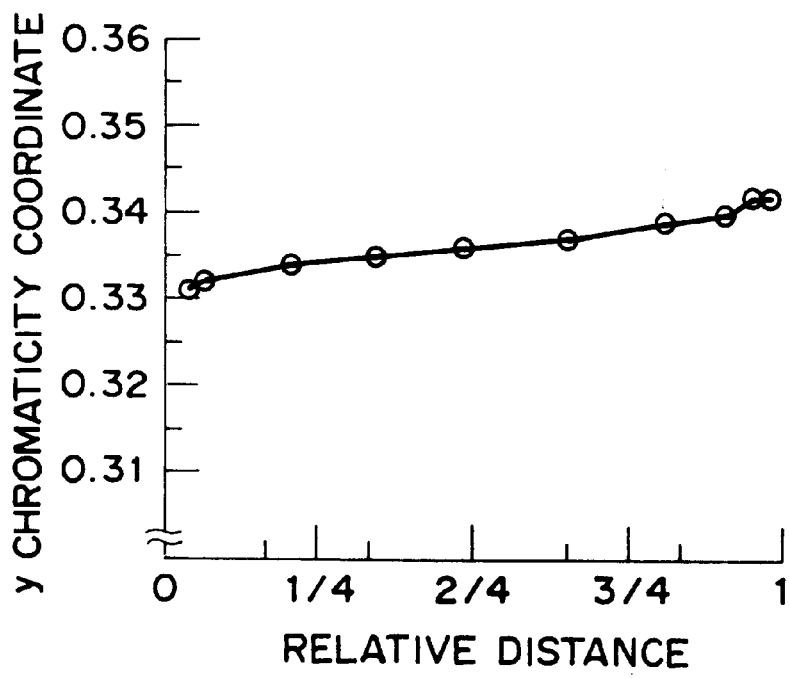
Figure 18A:
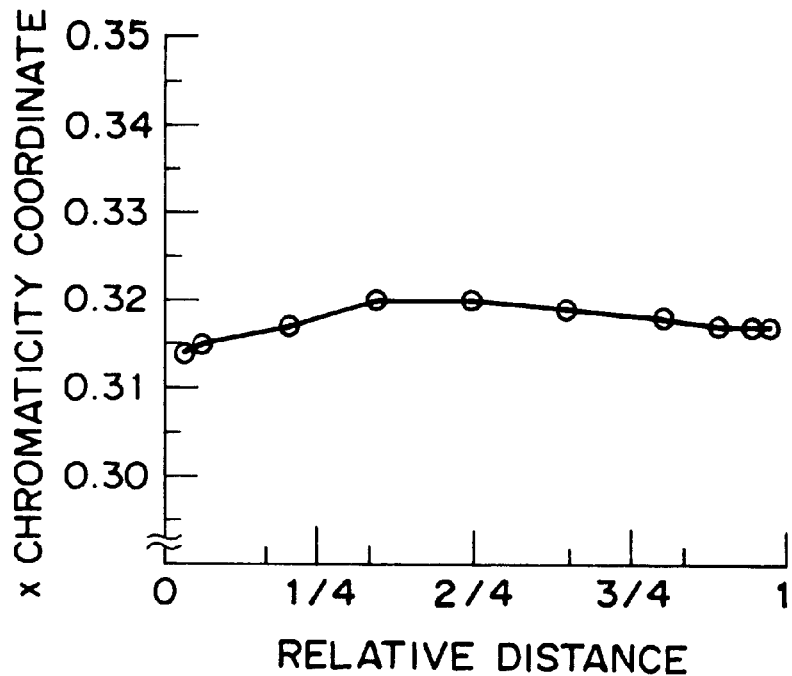
Figure 18B:
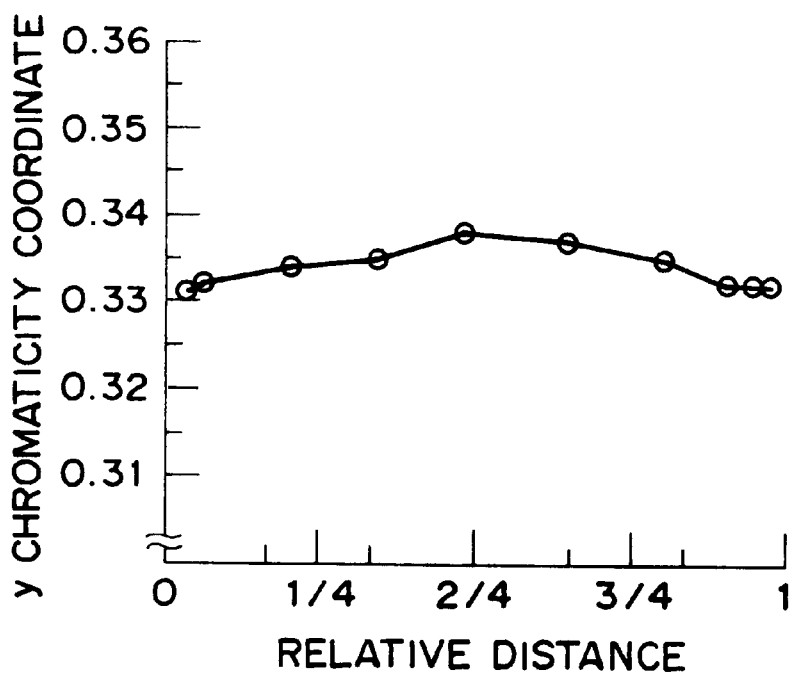

FIGS. 16A and 16B showed x and y coordinate-changing characteristics of the backlight alone to be used in combination with Device 1, respectively, and FIGS. 18A and 18B showed those of the backlight alone to be used in combination Device 3.

Figure 17A:
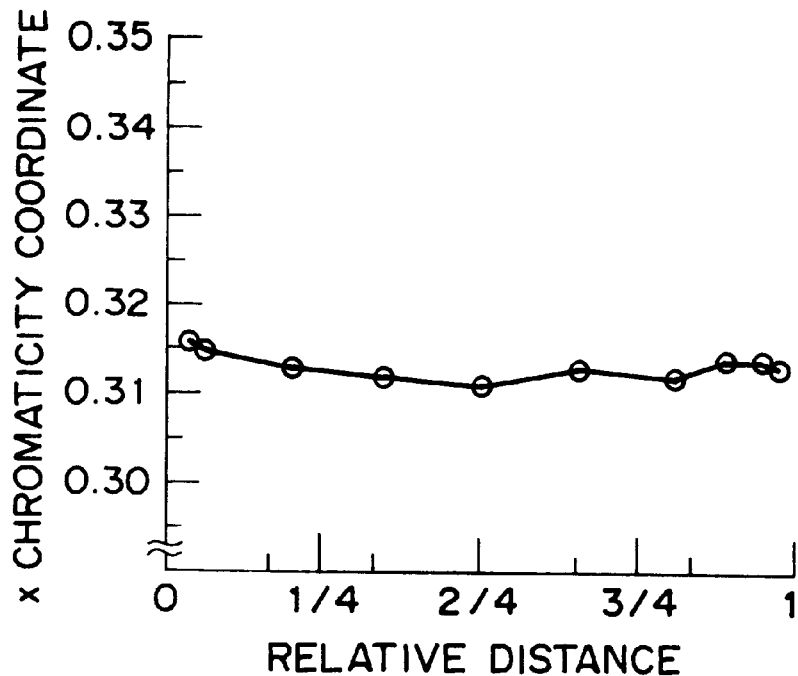
Figure 17B:
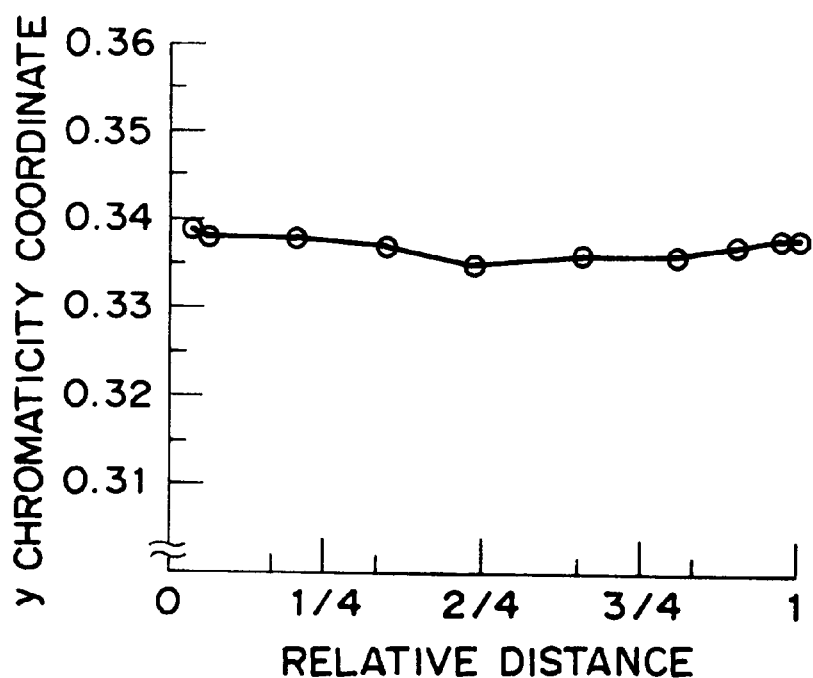
Figure 19A:
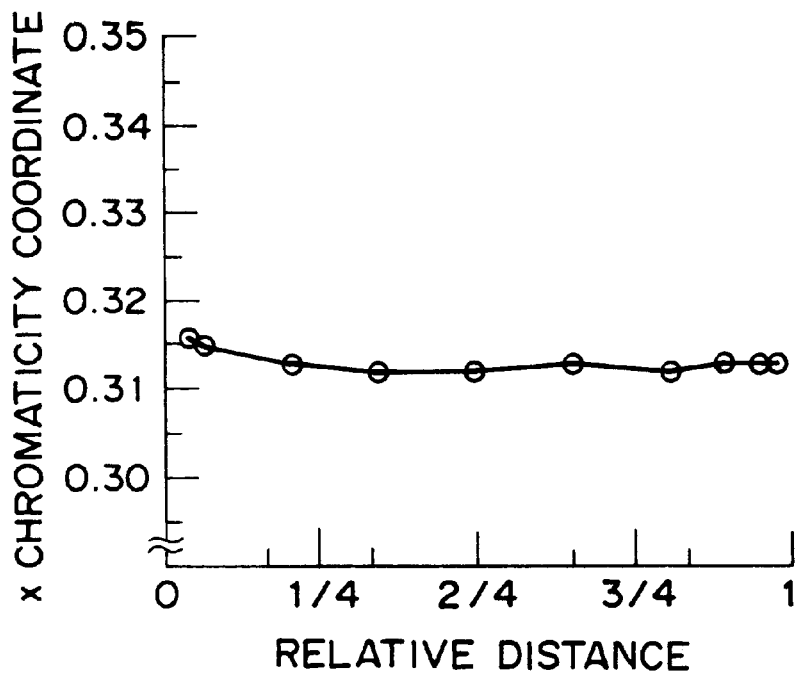
Figure 19B:
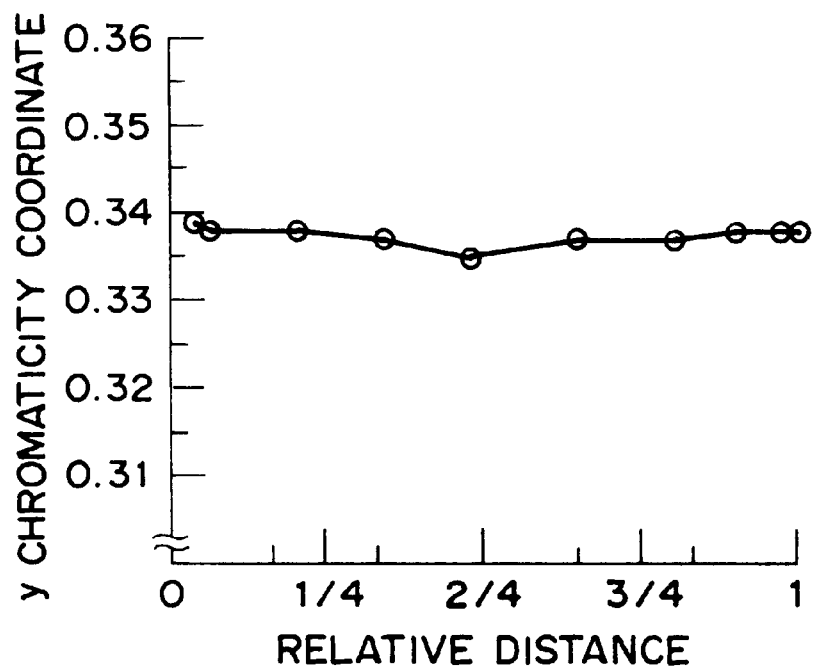

When these backlight were used in combination with the corresponding device (Device 1 or 3), x and y coordinate-changing characteristics shown in FIGS. 17A and 17B (for Device 1) and FIGS. 19A and 19B (for Device 3) were obtained, respectively.

Figure 20A:
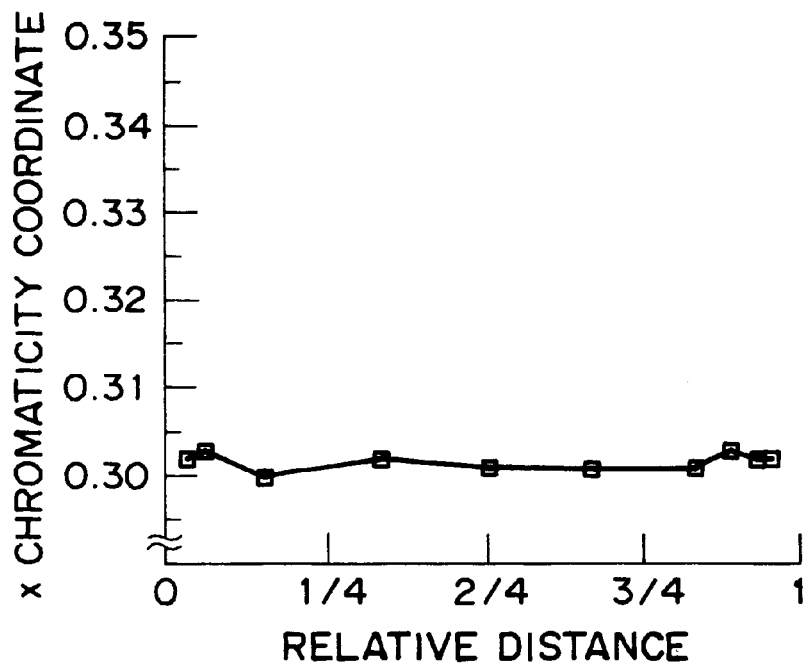
Figure 20B:
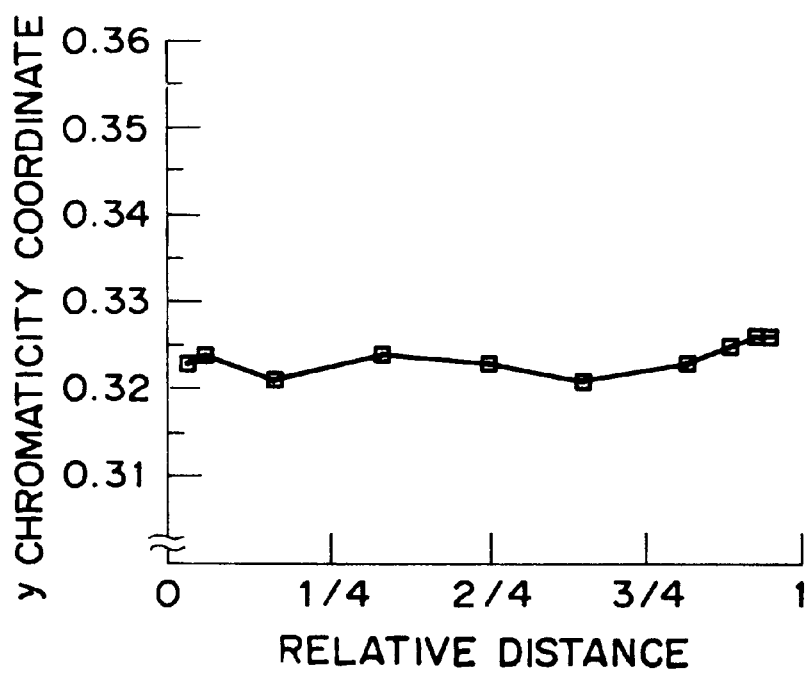

Separately, when Device 2 (having a uniform cell gap) was used in combination with a backlight emitting a planar light having a substantially uniform chromaticity, x and y coordinate-changing characteristics shown in FIGS. 20A and 20B were obtained.

From the results shown in FIGS. 17a and 17B, 19A and 19B, and 20A and 20B, it was found that an excessive chromaticity distribution of the liquid crystal device having the cell gap-changing characteristic (Device 1 or 3) was minimized by using the backlight having the corresponding chromaticity distribution in combination as compared with the case of using the backlight having a substantially uniform chromaticity (or having a smaller chromaticity distribution), thus providing a substantially uniform chromaticity distribution, as a whole, similar to that of the combination of the liquid crystal device having the uniform cell gap (Device 2) and the backlight of uniform planar light-type.

EXPERIMENTAL EXAMPLE 5

In this experimental example, the prevention of damage or breakage of a sealing agent capable of occurring in the production process of a liquid crystal device having the cell gap-changing characteristic was investigated.

Ten liquid crystal devices were produced in the same manner as in Device 1 prepared in Experimental Example 1 except that the length of the injection port (⅓ of the length of the corresponding side of the sealing portion) was changed to ¼ thereof and that the adhesively bonding conditions (160° C.; 1 kg/cm², 1 hour) were changed to 160° C., 2 kg/cm² and 1 hour.

In these production process, eight liquid crystal devices were found to cause peeling or breakage of the sealing agent 18 along with the electrode extension direction perpendicular to the sealing agent extension direction in the vicinity of regions 18a and 18b as shown in FIG. 21.

Separately, when other ten liquid crystal devices were produced in the same manner as in the above-mentioned ten liquid crystal devices except that additional sealing portions 22 (each having a width of ca. 0.15 mm and a length of ca. 295 mm at a spacing with the sealing portion 18 of ca. 4.6 mm) were disposed partially in parallel to the sealing portion 18 in the scanning electrode extension direction as shown in FIG. 22, no peeling or breakage of the sealing agent was observed in all the devices.

In this experimental example, even when the narrower injection port was formed on the substrate side having a smaller cell gap and the hot baking (curing) of the sealing agent was performed under the severer conditions, the production of the liquid crystal device according to the present invention was found to be stably performed.

Further, the thus prepared liquid crystal device can stably provide excellent display qualities as substantiated in, e.g., Experimental Example 1 for a long time.

As described hereinabove, according to the present invention, it is possible to minimize an excessive temperature distribution in the effective optical modulation region particularly in the vicinity of the drive circuit connecting portion by providing a liquid crystal device with a specific cell gap-changing characteristic, thus improving display characteristics within the entire effective optical modulation region.

What is claimed is:

1. A liquid crystal device, comprising: a pair of oppositely disposed substrates each provided with a plurality of electrodes and a chiral smectic liquid crystal disposed so as to fill a prescribed gap between the substrates together with a plurality of spacers dispersed therein, said substrates including a substrate having four sides at least one of which has a connecting portion to be connected with a drive circuit supplying a voltage to associated electrodes;

wherein said spacers show a dispersion density change depending on a distance from said connecting portion; and wherein said prescribed gap is decreased with an increasing distance from said connecting portion.

2. A device according to claim 1, wherein one substrate is provided with a plurality of scanning electrodes and the other substrate is provided with a plurality of data electrodes disposed so as to form an electrode matrix together with the scanning electrodes, said connecting portion being provided to said one substrate provided with the scanning electrodes.

3. A device according to claim 1 or 2, wherein said prescribed gap is sufficient to suppress the formation of a helical structure of chiral smectic liquid crystal molecules.

4. A device according to claim 1, wherein said spacers have a dispersion density which is decreased with an increasing distance from said connecting portion.

5. A device according to claim 2, wherein said spacers show a dispersion density change depending on a distance from said connecting portion.

6. A device according to claim 2, wherein said spacers have a dispersion density which is decreased with an increasing distance from said connecting portion.

7. A device according to claim 2, wherein said connecting portion is provided to only one side of said one substrate.

8. A device according to claim 2, wherein said connecting portion is provided to two opposite sides of said one substrate.

9. A device according to claim 1, wherein said pair of substrates are applied to each other with a sealing agent disposed at a periphery of the substrates, said sealing agent providing a first sealing portion disposed along the periphery and a second sealing portion disposed at least partially parallel with said first sealing portion.

10. A device according to claim 1, wherein said prescribed gap includes a maximum gap $d_{max}$ and a minimum gap $d_{min}$ satisfying the following relationship:

$$(d_{max} - d_{min}) \times 100 / [(d_{max} + d_{min})/2] \geq 5 (\%).$$

11. A device according to claim 10, wherein said gaps $d_{max}$ and $d_{min}$ satisfy the following relationship:

$$30(\%) \geq (d_{max} - d_{min}) \times 100/[(d_{max} + d_{min})/2] \geq 5(\%).$$

12. A liquid crystal display apparatus, comprising:

a liquid crystal device comprising a pair of oppositely disposed substrates each provided with a plurality of electrodes and a liquid crystal disposed so as to fill a prescribed gap between the substrates together with a plurality of spacers dispersed therein, said substrates including a substrate having four sides at least one of which has a connecting portion to be connected with a drive circuit supplying a voltage to associated electrodes; wherein said prescribed gap is changed depending on a distance from said connecting portion; and illumination means for illuminating said liquid crystal device with a planar light providing a chromaticity distribution depending on the change in said prescribed gap.

13. A liquid crystal display apparatus, comprising:

a liquid crystal device comprising a pair of oppositely disposed substrates each provided with a plurality of electrodes and a liquid crystal disposed so as to fill a prescribed gap between the substrates together with a plurality of spacers dispersed therein, said substrates including a substrate having four sides at least one of which has a connecting portion to be connected with a drive circuit supplying a voltage to associated electrodes; wherein said spacers show a dispersion density changed depending on a distance from said connecting portion; and illumination means for illuminating said liquid crystal device with a planar light providing a chromaticity distribution depending on the change in said dispersion density.

14. An apparatus according to claim 12, wherein said liquid crystal is a chiral smectic liquid crystal.

15. An apparatus according to claim 13, wherein said liquid crystal is a chiral smectic liquid crystal.

16. An apparatus according to claim 12, wherein said spacers are dispersed at a density which changes depending on a distance from said connecting portion.

17. An apparatus according to claim 12, wherein said spacers are dispersed at a density which is decreased with an increasing distance from said connecting portion.

* * * * *